(12) United States Patent
Aders

(10) Patent No.: US 9,604,124 B2
(45) Date of Patent: Mar. 28, 2017

(54) TECHNOLOGIES FOR TRANSPORTATION

(71) Applicant: Aaron Benjamin Aders, New Rochelle, NY (US)

(72) Inventor: Aaron Benjamin Aders, New Rochelle, NY (US)

(*) Notice: Subject to any disclaimer, the term of this patent is extended or adjusted under 35 U.S.C. 154(b) by 0 days.

(21) Appl. No.: 15/064,309

(22) Filed: Mar. 8, 2016

(65) Prior Publication Data

US 2016/0184690 A1    Jun. 30, 2016

Related U.S. Application Data

(63) Continuation-in-part of application No. 15/047,230, filed on Feb. 18, 2016, which is a continuation of application No. PCT/US2014/068401, filed on Dec. 3, 2014.

(60) Provisional application No. 62/004,692, filed on May 29, 2014, provisional application No. 61/912,455, filed on Dec. 5, 2013, provisional application No. 62/130,114, filed on Mar. 9, 2015.

(51) Int. Cl.

| A63C 17/01 | (2006.01) |
|---|---|
| A63C 17/04 | (2006.01) |
| A63C 17/12 | (2006.01) |
| A63C 17/26 | (2006.01) |
| A63C 17/00 | (2006.01) |
| A63C 17/22 | (2006.01) |

(52) U.S. Cl.
CPC ............ *A63C 17/12* (2013.01); *A63C 17/004* (2013.01); *A63C 17/014* (2013.01); *A63C 17/226* (2013.01); *A63C 17/262* (2013.01); *A63C 17/012* (2013.01); *A63C 2203/10* (2013.01)

(58) Field of Classification Search
CPC ....... A63C 17/01; A63C 17/014; A63C 17/04; A63C 17/12
See application file for complete search history.

(56) References Cited

U.S. PATENT DOCUMENTS

| 4,969,655 | A | | 11/1990 | Katz | |
|---|---|---|---|---|---|
| 5,020,621 | A | * | 6/1991 | Martin | ................... A63C 17/01 180/180 |
| 5,487,441 | A | | 1/1996 | Endo et al. | |
| 5,540,455 | A | | 7/1996 | Chambers | |
| 5,833,252 | A | * | 11/1998 | Strand | ................ A63C 17/0033 16/35 D |
| 5,893,425 | A | | 4/1999 | Finkle | |

(Continued)

FOREIGN PATENT DOCUMENTS

| WO | WO 2006016880 A2 | 2/2006 |
|---|---|---|
| WO | WO 2012113011 A1 | 8/2012 |

(Continued)

OTHER PUBLICATIONS

International Search Report and Written Opinion dated Mar. 4, 2015 issued in related International Application No. PCT/US14/68401 filed Dec. 3, 2014 (9 pages).

*Primary Examiner* — Bryan Evans
(74) *Attorney, Agent, or Firm* — Dentons US LLP

(57) ABSTRACT

An apparatus comprising a platform; a plurality of trucks coupled to the platform; and a roller assembly coupled to the platform, wherein the roller assembly is configured for an omnidirectional rotation, wherein the roller assembly is configured for an elastic biasing, wherein the roller assembly is driven by a motor.

6 Claims, 20 Drawing Sheets

(56) References Cited

U.S. PATENT DOCUMENTS

| | | | |
|---|---|---|---|
| 5,950,754 A | 9/1999 | Ondrish, Jr. | |
| 8,505,671 B1 * | 8/2013 | Mohns | B60K 7/0015 |
| | | | 180/305 |
| 2005/0006158 A1 | 1/2005 | Tsai | |
| 2007/0272465 A1 | 11/2007 | Su | |
| 2012/0169178 A1 | 7/2012 | Toledo et al. | |
| 2013/0081891 A1 * | 4/2013 | Ulmen | A63C 17/12 |
| | | | 180/181 |
| 2013/0175775 A1 | 7/2013 | Bermal | |
| 2013/0175777 A1 | 7/2013 | Bermal | |

FOREIGN PATENT DOCUMENTS

| | | |
|---|---|---|
| WO | WO 2013103373 A1 | 7/2013 |
| WO | WO 2013103729 A1 | 7/2013 |

* cited by examiner

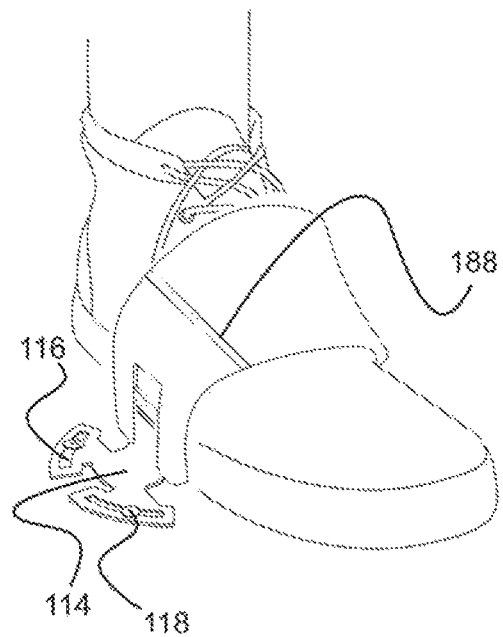
FIG. 15
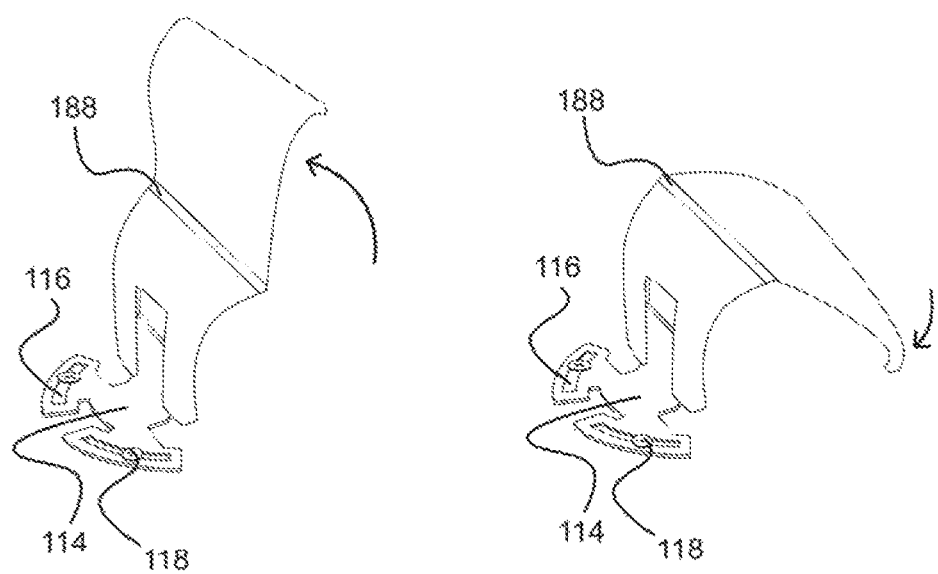
FIG. 16
FIG. 17

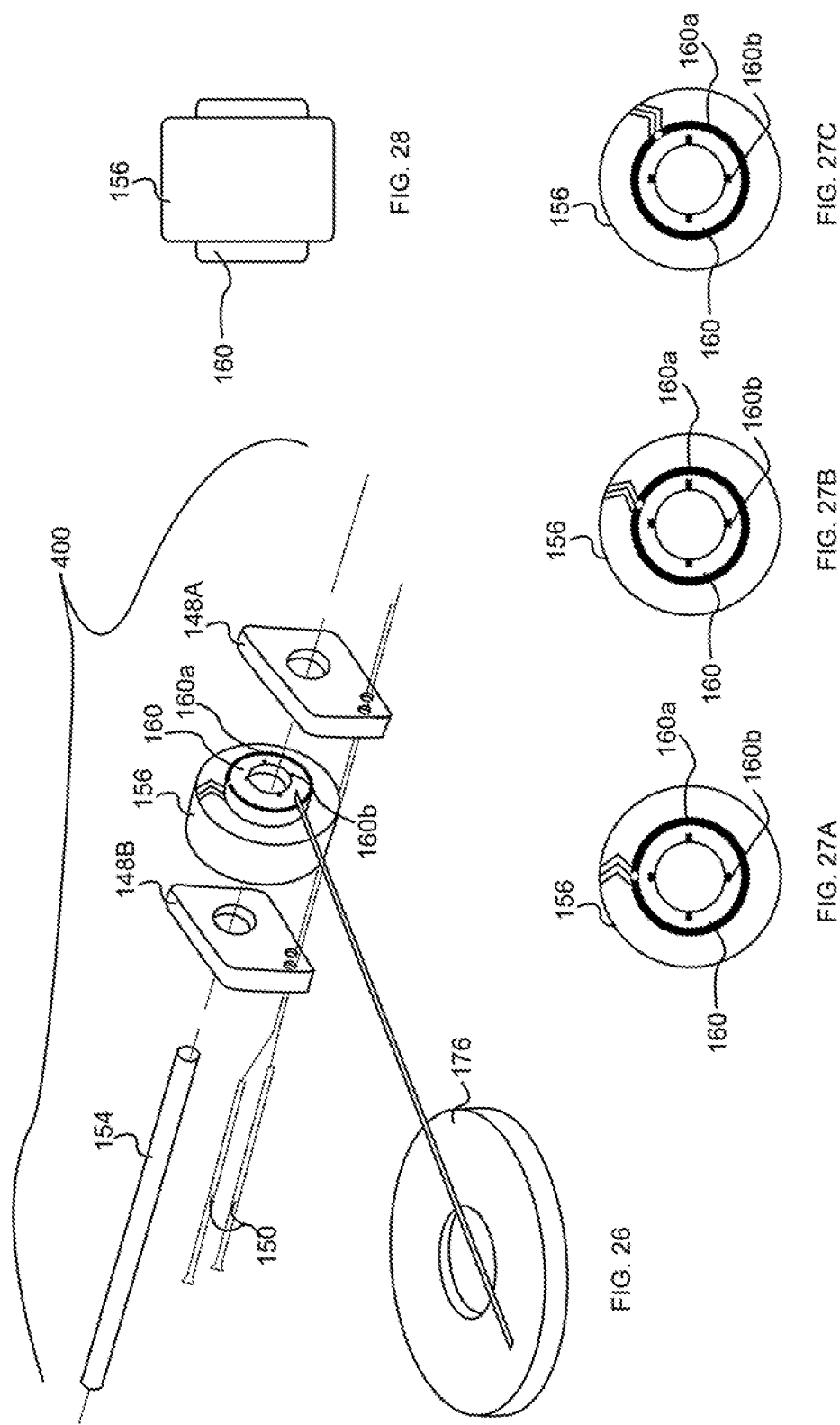

TECHNOLOGIES FOR TRANSPORTATION

CROSS-REFERENCE TO RELATED APPLICATIONS

This application (1) is a Continuation-in-Part of U.S. Non-Provisional patent application Ser. No. 15/047,230, filed 18 Feb. 2016, which is a Continuation of International Application PCT/US14/68401, filed 3 Dec. 2014, which claims a benefit of U.S. Provisional Patent Application 62/004,692, filed 29 May 2014 and U.S. Provisional Patent Application 61/912,455, filed 5 Dec. 2013; and (2) claims a benefit of U.S. Provisional Patent Application 62/130,114, filed 9 Mar. 2015; each of which is herein fully incorporated by reference for all purposes.

TECHNICAL FIELD

Generally, the present disclosure relates to transportation. More particularly, the present disclosure relates to motorized transportation.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure is concerned with. Further, nothing is disclaimed.

A rider can ride a lateral sliding roller board, such as a freeboard, on a city street, a sidewalk, a playground, a sports complex, or some other surface to simulate unique movements of snowboarding. However, such board is typically configured for riding down an incline, a mountain, or a hill since a lateral sliding movement unique to such board usually cannot be sustained while riding on a flat terrain or up an inclined terrain. If the rider does not have access to the incline, the hill, or the mountain, then the board typically cannot operate as designed. Resultantly, such state of being has generally contributed to a limited adoption of such board, as public access to the incline, the hill, or the mountain is not widespread. Although a powered skateboard allows the rider to ride without human power, such as in a "carving" style using a set of skateboard trucks, the powered skateboard is typically unable to provide the lateral sliding movement of the snowboard or the lateral sliding roller board.

BRIEF SUMMARY

The present disclosure at least partially addresses at least one of the above. However, the present disclosure can prove useful to other technical areas. Therefore, the claims should not be construed as necessarily limited to addressing any of the above.

According to an example embodiment of the present disclosure an apparatus is provided. The apparatus comprises a platform; a plurality of trucks coupled to the platform; and a roller assembly coupled to the platform, wherein the roller assembly is configured for an omnidirectional rotation, wherein the roller assembly is configured for an elastic biasing, wherein the roller assembly is driven by a motor.

According to an example embodiment of the present disclosure an apparatus is provided. The apparatus comprises a platform; a plurality of trucks coupled to the platform; a motor; a roller assembly coupled to the platform, wherein the roller assembly is configured for an omnidirectional rotation, wherein the roller assembly is configured for an elastic biasing; and a ducted fan coupled to the platform, wherein the motor drives the ducted fan.

The present disclosure may be embodied in the form illustrated in the accompanying drawings. However, attention is called to the fact that the drawings are illustrative. Variations are contemplated as being part of the disclosure, limited only by the scope of the claims.

BRIEF DESCRIPTION OF DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

FIG. 15 shows a perspective view of an example embodiment of a pivoting foot hook engaging a rider's foot according to the present disclosure.

FIG. 16 shows a perspective view of an example embodiment of a pivoting foot hook in an open position according to the present disclosure.

FIG. 17 shows a perspective view of an example embodiment of a pivoting foot hook in a closed position according to the present disclosure.

FIG. 26 shows a perspective view of an example embodiment of a motorized wheel assembly according to the present disclosure.

FIGS. 27A-27C show a plurality of side views of how an electric motor rotates with a roller according to the present disclosure.

FIG. 28 shows a top view of an electric motor and a roller according to the present disclosure.

DETAILED DESCRIPTION OF PREFERRED EMBODIMENTS

Figure 1:
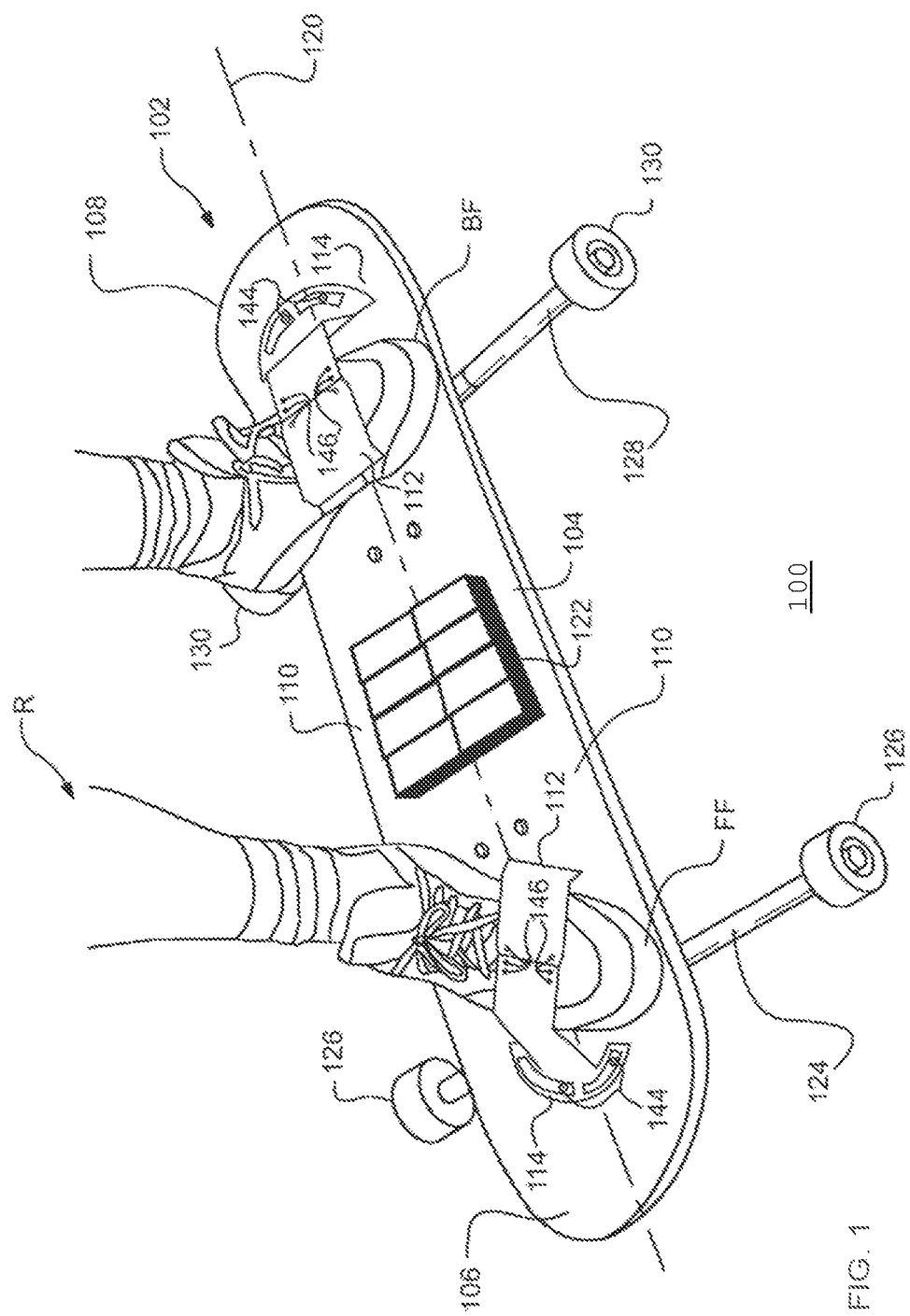
FIG. 1 shows a perspective view of an example embodiment of a powered lateral sliding roller board according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art.

Features described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (30) printing, laser cutting, computer numerical control routing, milling, pressing, stamping, vacuum forming, hydroforming, injection molding, lithography, and so forth.

Any and/or all elements, as disclosed herein, can be and/or include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can be and/or include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, opaqueness, luminescence, reflection, phosphorescence, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

As used herein, the term "about" and/or "substantially" refers to a +/−10% variation from the nominal value/term. Such variation is always included in any given value/term provided herein, whether or not such variation is specifically referred thereto.

U.S. Pat. No. 5,975,546 is herein fully incorporated by reference for all purposes. U.S. Pat. No. 4,250,658 is herein fully incorporated by reference for all purposes. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIG. 1 shows a perspective view of an example embodiment of a powered lateral sliding roller board according to the present disclosure. A powered lateral sliding roller board 100 comprises a platform 102 comprises a center portion 104, a front portion 106, and a rear portion 108. The platform 102 comprises a pair of side portions 110 extending longitudinally along the platform 102 through the front portion 106, the center portion 104, and the rear portion 108. The platform 102 comprises at least one of plastic, metal, rubber, wood, and glass, or any combinations thereof. In some embodiments, the front portion 106 is sufficiently different in at least one of size and shape from the rear portion 108 such that a rider can easily visually distinguish therebetween, but in other embodiments, the front portion 106 is not sufficiently different in at least one of size and shape from the rear portion 108 such that a rider can easily visually distinguish therebetween. Further, in some embodiments, the side portions 110 are symmetrical to each other, but in other embodiments, the side portions 110 are asymmetrical to each other. Also, in some embodiments, the platform 102 is at least one of wider and longer than a conventional skateboard platform, where the conventional skateboard platform is at least from about 7 inches to about 9 inches wide and from about 31 inches to about 34 inches long. For example, the platform 102 can be about 10 inches wide and about 40 inches long.

The board 100 further comprises a pair of foot hooks 112, positioned on opposing sides of the platform 102, such as the front portion 106 and the rear portion 108. Each of the foot hooks 112 comprises a foot hook plate 114, which can be assembled with and/or be unitary to the foot hook 112. At least one of the foot hooks 112 comprises at least one of plastic, metal, rubber, wood, and glass, or any combinations thereof. At least one of the foot hooks 112 can be unitary and/or an assembly. Each of the foot hooks 112 comprises a pair of opposing rows defined via a plurality of openings 146, at least one of which can be circular, square, triangular, or some other shape. Although the opposing rows are rectilinear in extension, the opposing rows can extend in other ways, such as arcuate, wavy, or zigzag. The openings 146 can be directly opposing each other or be offset from each other, such as via one position. Each of the foot hooks 112 comprises a pair of fasteners 144, such as a screw or a bolt. At least one of the fasteners 144 comprises at least one of plastic, metal, rubber, wood, and glass, or any combinations thereof. Each of the fasteners 144 corresponds to each of the rows defined via the openings 146. For each of the rows defined via the openings 146, each of the fasteners 144 extends through one of the openings 146. Such extension provides for foot hook 112 adjustment based on rider comfort, such as for accommodating various rider foot sizes, whether as measured in length, width, and/or height. Accordingly, the fasteners 144 can be fastened and unfastened selectively.

At least one of the foot hook plates 114 can be unitary and/or an assembly. At least one of the foot hook plates 114 comprises at least one of plastic, metal, rubber, wood, and glass, or any combinations thereof. Each of the foot hook plates 114 defines an opening 116 therein. Each of the foot hooks 112 is secured to the platform 102 via a fastener 118 extending through the opening 116. Note that the opening 116 in the foot hook 112 secured in the rear portion 108 is circular and the opening 116 in the foot hook 112 secured in the front portion 106 is arcuate. Resultantly, the foot hook 112 secured in the rear portion 108 is positionally fixed, as the opening 116 precludes any movement of the foot hook 112 secured in the rear portion 108. In contrast, the foot hook 112 secured in the front portion 106 is laterally rotatable, as the opening 116 enables a lateral movement of the foot hook 112 secured in the front portion 106. Such rotation provides an ability change an angle of a rider's foot. For example, the angle can range from about 0 degrees to about −45 degrees and about 0 degrees to about 45 degrees relative to a roughly perpendicular plane to an imaginary longitudinal center line 120 on of the platform 104. For another example, such rotation can be at least about 5 degrees from a central alignment position along the line 120 toward at least one of the side portions 110. Note that other ways of securing the foot hook 112 to the platform 102 can be used, such as nailing, adhering, mating, interlocking, bolting, or clamping. Also, note that both of the foot hooks 112 can be fixed in position, such as the foot hook 112 secured in the rear portion 108, or both of the hooks 112 can be laterally rotatable, such as the foot hook 112 secured in the front portion 106. In some embodiments, the board 100 comprises at most one foot hook 112, whether in a fixed position configuration or a laterally rotating configuration. In other embodiments, at least one of the foot hooks 112 is at least one of U-shaped, C-shaped, E-shaped, T-shaped, O-shaped, P-shaped, J-shaped, D-shaped, H-shaped, L-shaped, or V-shaped. Note that such foot hook 112 can be coupled to the platform 102 in any manner, such as via fastening, adhering, mating, or interlocking, at any point of the foot hook 112, whether upright, sideways, or inverted, for foot insertion thereinto such that a rider's foot is relatively secured to the platform 102. In some embodiments, the board 100 lacks at least one of the foot hooks 112. In some embodiments, the board 100 lacks both of the foot hooks 112 as the rider does not need to use the foot hooks 112 to ride the board 100 as at least one of the foot hooks 112 is operably coupled to the platform 102 to provide additional control and support.

An energy source 122 provides energy to a motor such that the motor is able to propel the board 100. The source 122 comprises at least one of plastic, metal, rubber, wood, and glass, or any combinations thereof. The source 122 may be an engine, a motor, a battery, a fuel tank, a photovoltaic cell, a capacitor, or another energy source. For example, the fuel tank can contain gasoline which is combusted in the engine such that the engine powers the motor to propel the board 100. The source 122 can be rechargeable whether in a wireless manner, such as via induction, and/or a wired manner, such as via a line. The source 122 is secured to the platform 102, between the foot hooks 112 on an upper side of the platform 102. The source 122 is secured to the platform 102 via fastening, but in other embodiments, the source 122 is secured to the platform 102 via nailing, adhering, mating, interlocking, bolting, clamping, or any combinations thereof. In yet other embodiments, the source 122 is secured to the platform 102, between the foot hooks 112 on a lower side of the platform 102. In still other embodiments, the source 122 is not between the foot hooks 122, such as in the front portion 106 and/or the rear portion 108. Note that more than one source 122 can be used in any manner, whether powering one or more motors in any manner, whether synchronously and/or asynchronously, independently and/or dependently, in one manner and/or in different manners, and/or in any type of correspondence, such as one-to-one, many-to-many, one-to-many, and/or many-to-one.

The board 100 further comprises a front truck 124 comprising a pair of frontal wheels 126 and a rear truck 128 comprising a pair of rear wheels 130. The front truck 124 is secured to the platform 102 in the front portion 106, such as via fastening, adhering, mating, or interlocking. The rear truck 128 is secured to the platform 102 in the rear portion 108, such as via fastening, adhering, mating, or interlocking. At least one of the front truck 124, the rear truck 128, at least one of the frontal wheels 126, and at least one of the rear wheels 130 comprises at least one of plastic, metal, rubber, wood, and glass, or any combinations thereof.

In one mode of operation, a rider R stands on the platform 102 such that the rider's R feet are under the foot hooks 112 in a stance similar to that used for snowboarding, surfing, or skateboarding. The rider R stands sideways with a back foot BF roughly perpendicular or at a varying angle to the line 120 and a front foot FF being roughly perpendicular or at a varying angle to the line. This stance allows the rider R to easily shift the rider's R weight onto the rider's R toes or onto the rider's R heels. However, note that the rider's R feet can be at any angle, as measured from the line 120, as many riders have their own 'stance' preferences with known angles. For example, some riders ride at a 30/15 orientation where 30 degrees in the front foot FF and 15 degrees on the back foot BF, as measured from the line 120. The rider R can also move freely about the upper side of the platform 102, assuming different stances for different maneuvers. As with a conventional skateboard, the front portion 106 and the rear portion 108 angle upwards from the platform 102. Via transferring the rider's R weight to the front portion 106 or the rear portion 108, the rider R can perform numerous tricks and maneuvers where part or all of the powered lateral sliding roller board 100 becomes elevated from a ground surface on which at least one of the wheels 126 and the wheels 130 roll. Note that the board 100 can ride forwards, backwards, or laterally.

Figure 2:
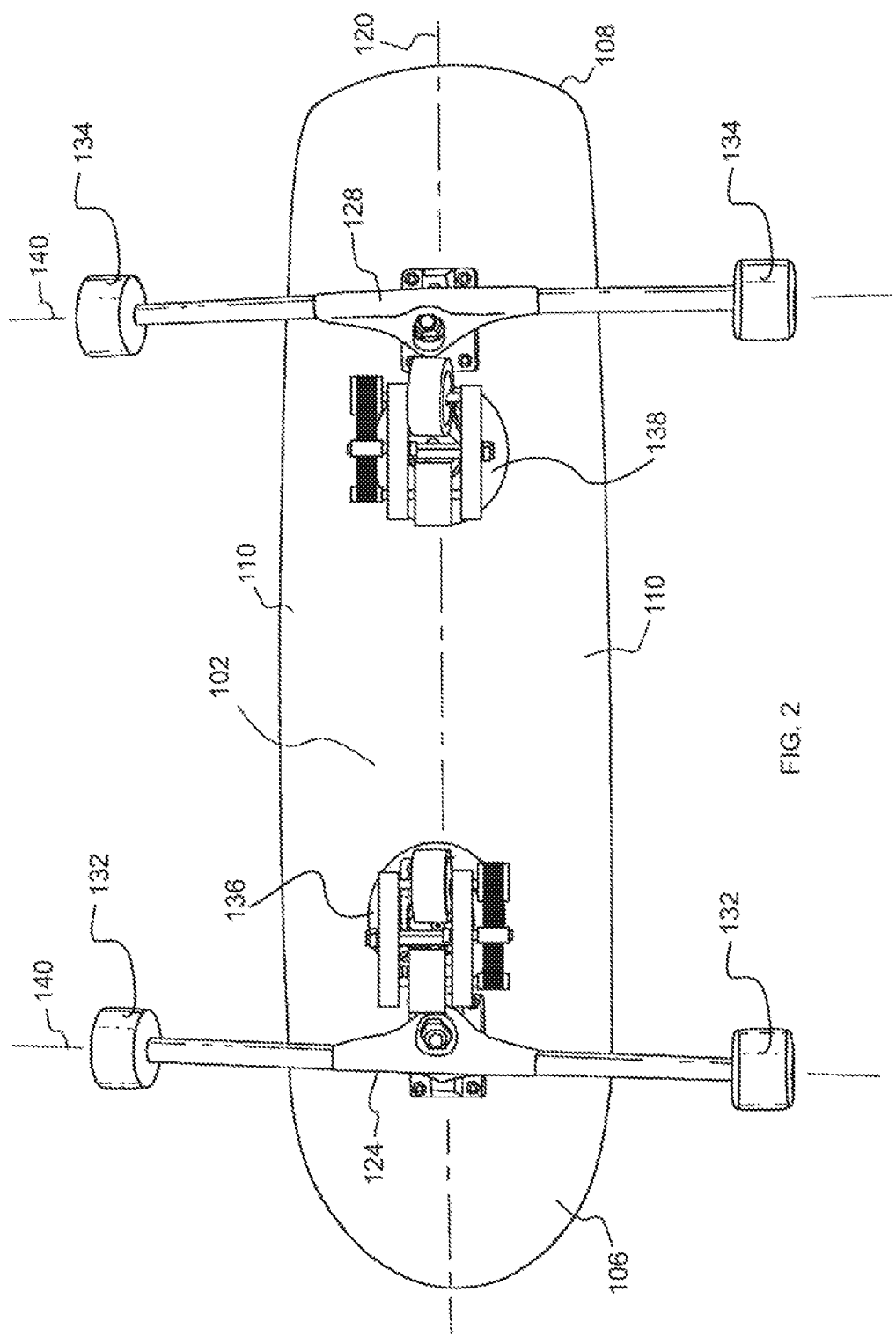
FIG. 2 shows an underside view of an example embodiment of a powered lateral sliding roller board according to the present disclosure.

FIG. 2 shows an underside view of an example embodiment of a powered lateral sliding roller board according to the present disclosure. Some elements of this figure are described above. Thus, same reference characters identify identical and/or like components described above and any repetitive detailed description thereof will hereinafter be omitted or simplified in order to avoid complication.

The truck 124 comprises a fixed wheel assembly 132 and the truck 128 comprises a fixed wheel assembly 134, both of which are positioned along the line 120 opposing each other. In other embodiments, the assembly 132 and the assembly 134 are offset from each other. In some embodiments, at least one of the assembly 132 and the assembly 134 is powered via a motor, at least as described herein, whether independently from each other and/or dependent on each other, whether in a synchronized manner and/or a non-synchronized manner. In some embodiments, at least one of the assembly 132 and the assembly 134 is not fixed, such as rotating, for instance within about 50 degrees to each side of the platform 102 from the line 120. Note that each of the wheel assembly 132 and the assembly 134 can have two wheels, less than two wheels, and/or more than two wheels, whether per assembly and/or per side.

The board 100 further comprises a plurality of motorized roller assemblies 136, 138 secured to the platform 102, such as via fastening, adhering, mating, or interlocking, between the assembly 132 and the assembly 134. However, in other embodiments, at least one of the roller assemblies 136, 138 is not between the assembly 132 and the assembly 134, such as between a frontal tip of the platform 102 and the assembly 132 or between a rear tip of the platform 102 and the assembly 134 or no roller assemblies 136, 138 are between the assembly 132 and the assembly 134. The roller assemblies 136, 138 are aligned with each other and along the line 120. However, in other embodiments, the roller assemblies 136, 138 are not aligned with each other and/or along the line 120, such only one of the roller assemblies 136, 138 is aligned along the line 120 or the roller assemblies 136, 138 are offset from each other while not being aligned to the line 120. Each of the roller assemblies 136, 138 is configured to rotate 360 degrees with respect to the platform 102. Each of the roller assemblies 136, 138 is configured to be elastically biased, such as via a spring, for instance a coiled spring, while constantly contacting the ground surface and self-aligning with a direction of force applied onto the platform 102 during riding. More particularly, each of the roller assemblies 136, 138 is elastically biased, such as via a spring, to self-align along the line 120, pointed either forward towards the front portion 106 or backward towards the rear portion 108, without interfering with motor-powered operation of each of the roller assemblies 136, 138. Such bias simulates a natural tracking tendency of a ski and/or a snowboard, while enhancing rider control. Also, note that the bias is sufficiently strong to add rider control, yet configured such that the rider is substantially precluded from rotating the platform 102 into sideways riding. In some embodiments, the bias manifests via a roller being attached to a frame, while rotating about a horizontal axis of rotation, with a cam follower being pivotally coupled to the frame and including a torsion spring. The cam follower comprises a bearing. The cam follower is forced by an elastic member, such as a spring, to be positioned against a cam which is fixed relative to the platform 102, which causes the frame to rotate to a position of least force between the cam and the cam follower. Accordingly, a bias profile is established via adjusting at least one of a cam shape and a spring force on the cam follower. One example of the cam is a pair of M-shaped curves symmetrically coupled to each other at their ends at a pair of apexes. In some embodiments, only one of the roller assemblies 136, 138 is motor powered. In some embodiments, at least one of the roller assemblies 136, 138 comprises the source 122. Note that although the roller assemblies 136, 138 are described in a context of the board 100, at least one of the roller assemblies 136, 138 can be applied to other environments, functions and/or structures, at least in a manner as described herein, such as in a luggage item, a suitcase, a travel bag, a roller skate, an industrial equipment device, a material handling equipment item, a furniture item, a toy, a cart, a robot, a wheelchair, a medical device, a stretcher, a bed, a gurney, a chair, a table, a shopping cart, a platform truck, a tow line in a plant, a pallet, a skid, a video game console, a computer, and/or a vehicle, whether land, aerial, and/or marine, whether manned and/or unmanned, whether for recreation, construction, military, industrial, law enforcement, or medical purposes.

The fixed wheel assemblies 132, 134 provide a different functional characteristic and a different effect on maneuvering than do the roller assemblies 136, 138. Resultantly, arranging the fixed wheel assemblies 132, 134 with the roller assemblies 136, 138 as shown simulates snowboarding relatively effectively, while travelling under power across flat terrain, down inclined terrain, or up inclined terrain. At least one of the fixed wheel assemblies 132, 134 comprises at least one of plastic, metal, rubber, wood, and glass, or any combinations thereof. At least one of the roller assemblies 136, 138 comprises at least one of plastic, metal, rubber, wood, and glass, or any combinations thereof.

Note that the roller assemblies 136, 138 can be identical to and/or different from each other in any way, at least as described herein, whether structurally and/or functionally. For example, one of the roller assemblies 136, 138 can be biased and the other one of the roller assemblies 136, 138 can be non-biased, although both can be biased or non-biased. Also, for example, one of the roller assemblies 136, 138 can be powered in one manner and the other one of the roller assemblies 136, 138 can be powered in another manner, although both can be both can be powered in one manner. Additionally, for example, one of the roller assemblies 136, 138 can comprise one type of motor and the other one of the roller assemblies 136, 138 can comprise another type of motor, although both can comprise one type of motor. Moreover, for example, one of the roller assemblies 136, 138 can comprise one type of driving mechanism and the other one of the roller assemblies 136, 138 can comprise another type of driving mechanism, although both can comprise one type of driving mechanism.

Note that the fixed wheel assemblies 132, 134 are sufficiently spaced apart such that the board 100 is relatively stable to ride on. Resultantly, as a distance between the fixed wheels assemblies 132, 134 increases, the board 100 rides in a more stable manner. For example, a distance from a transverse axis 140 of the fixed wheel assembly 132 to a transverse axis 142 of the fixed wheel assembly 134 is longer than the conventional skateboard, such as by about 33% in some embodiments. Also, note that the fixed wheel assemblies 132, 134 and the roller assemblies 136, 138 are sufficiently close such that the fixed wheel assemblies 132, 134 and the roller assemblies 136, 138 avoid mechanical interference with each other. Similarly, note that as a distance between the roller assemblies 136, 138 grows, the board 100 rides in a more stable manner.

Figure 3:
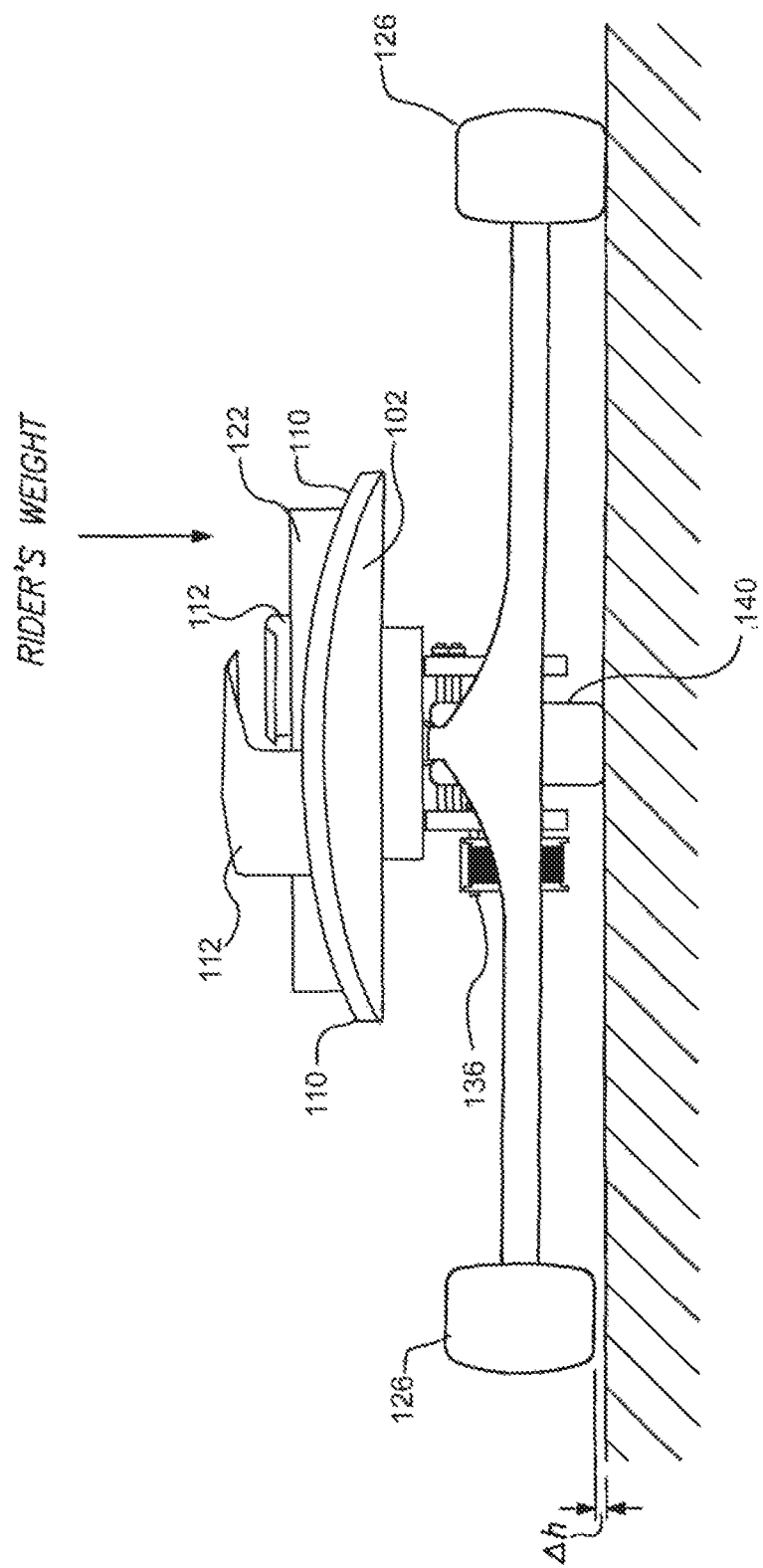
FIG. 3 shows a frontal view of an example embodiment of a powered lateral sliding roller board in a first state according to the present disclosure.

FIG. 3 shows a frontal view of an example embodiment of a powered lateral sliding roller board in a first state according to the present disclosure. Some elements of this figure are described above. Thus, same reference characters identify identical and/or like components described above and any repetitive detailed description thereof will hereinafter be omitted or simplified in order to avoid complication.

The roller assembly 136 comprises a roller 140, which is motorized, as powered via the energy source 122. The board 100 is in a first riding state where the board 100 rides on the left wheel 126 and the roller 140, with the right wheel 126 being raised above the ground surface at a height differential of $\Delta h$. The first state can be initiated via the rider R leaning toward the left side 110. The left wheel 126 is assisted in rolling via the roller 140, as powered via the motor. Note that similar state of being exists with respect to the rear truck 128 and the rear roller assembly 138. Also, note that via the rider R shifting weight from one side to another, the rider R can use the powered lateral sliding roller board 100 to carve under power without entering into a sliding mode.

Figure 4:
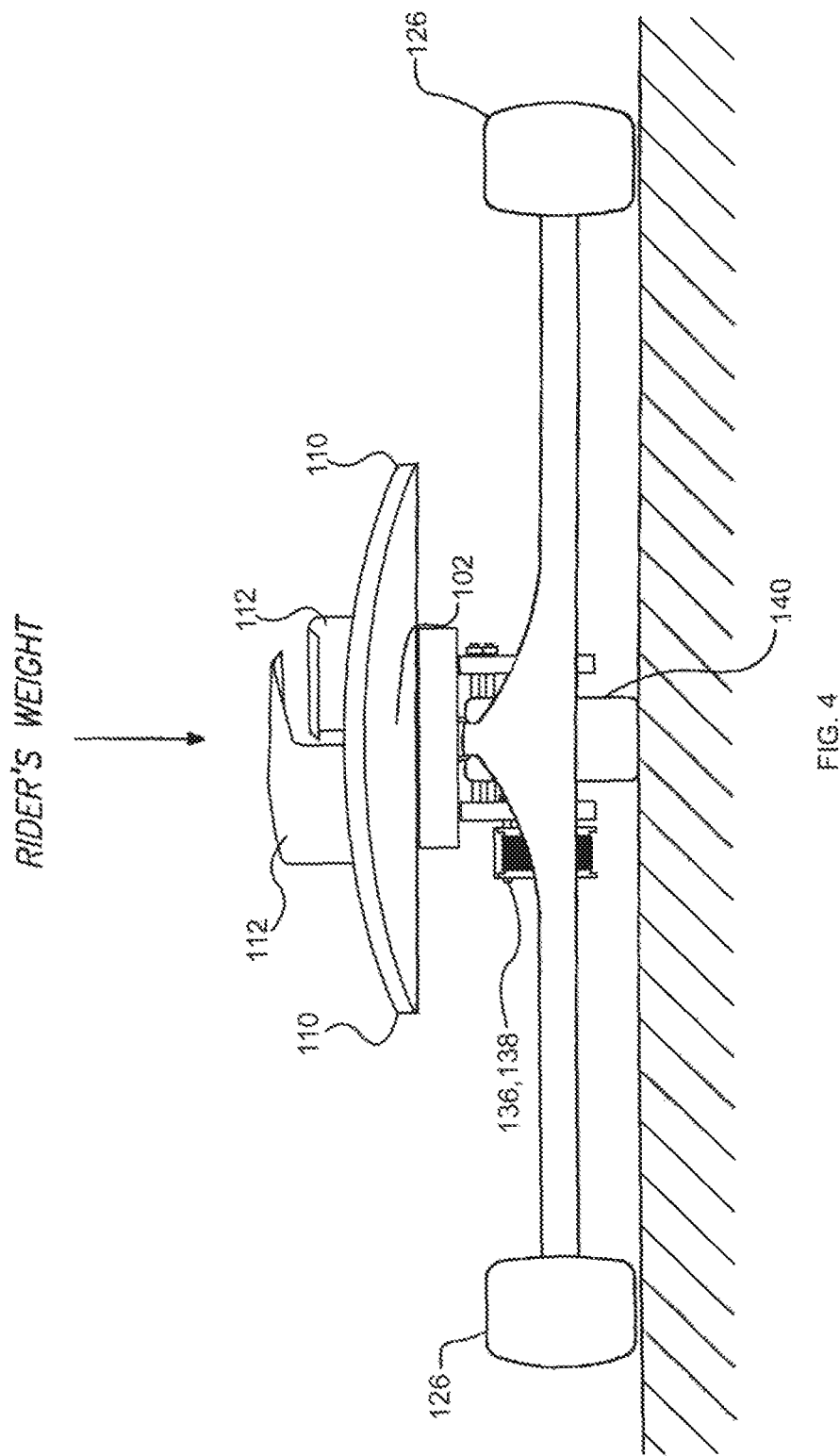
FIG. 4 shows a frontal view of an example embodiment of a powered lateral sliding roller board in a second state according to the present disclosure.

FIG. 4 shows a frontal view of an example embodiment of a powered lateral sliding roller board in a second state according to the present disclosure. Some elements of this figure are described above. Thus, same reference characters identify identical and/or like components described above and any repetitive detailed description thereof will hereinafter be omitted or simplified in order to avoid complication.

The board 100 is in a second riding state where the board 100 rides on the roller 140, with the left wheel 126 and the right wheel 126 being raised above the ground surface. The second state can be initiated via the rider R centering and/or sufficiently balancing on the platform 102 without overly leaning toward the left side 110 or the right side 110. The roller 140, whether motor powered or not, enables such riding of the board 100. Note that similar state of being exists with respect to the rear truck 128 and the rear roller assembly 138. Also, note that the rider's R weight rests solely on the roller assemblies 136, 138 and the board 100 can ride, whether motor powered or not, in any direction according to an omnidirectional rotation of the roller assemblies 136, 138, such as 360 degrees. However, note that such type of riding and/or omnidirectional rotation can be limited via elastic biasing, such as via a spring, of the roller assemblies 136, 138. Also note that entering the omnidirectional riding mode does not necessarily depend on the wheels 126 being raised from the ground surface. One factor is how much force is being applied onto the wheels 126. For example, if the rider R is generally centered over the platform 102, then the rider's R weight substantially rests on the pivoting rollers 140, which decreases friction between the wheels 126 and the ground surface to a level where the board 100 can slide laterally.

Figure 5:
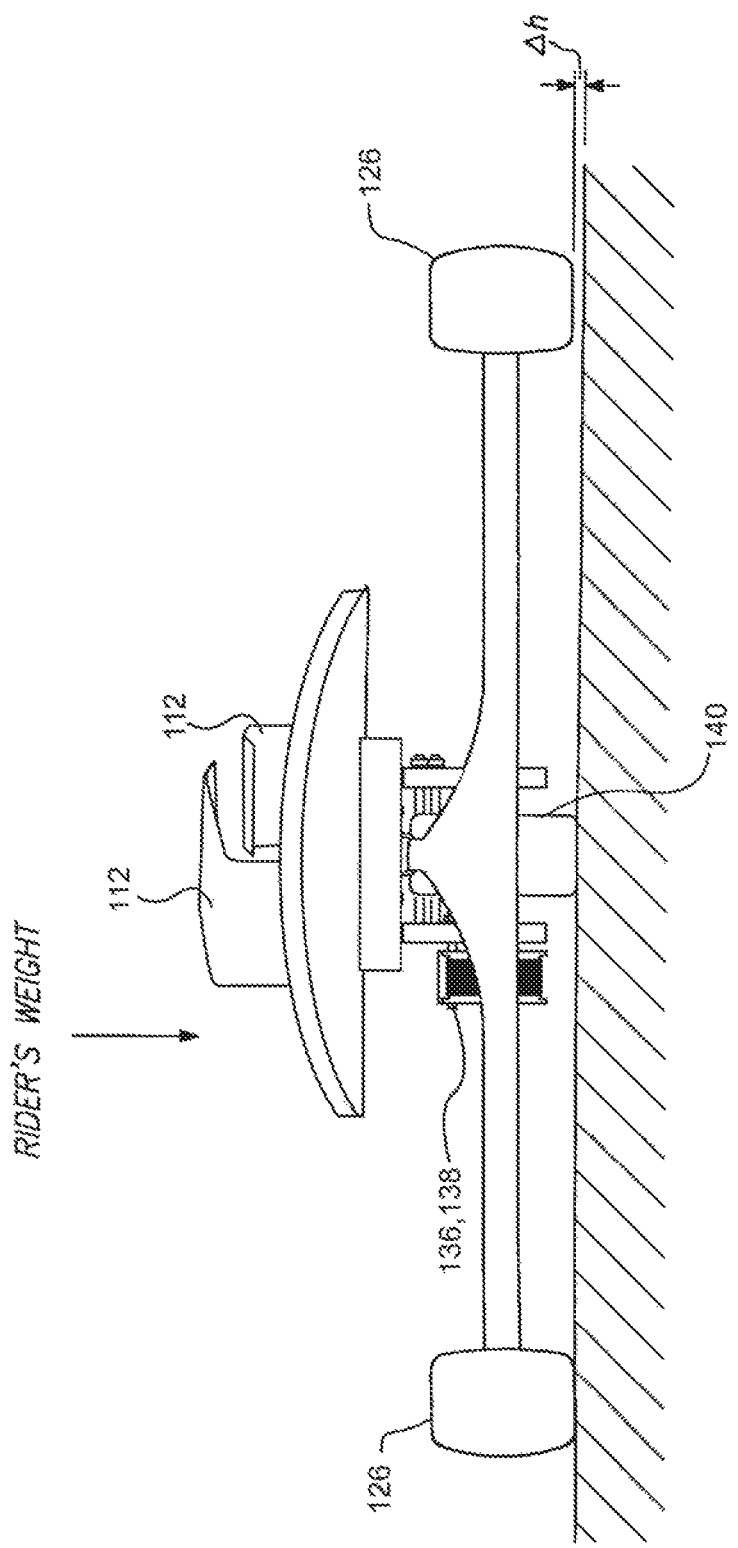
FIG. 5 shows a frontal view of an example embodiment of a powered lateral sliding roller board in a third state according to the present disclosure.

FIG. 5 shows a frontal view of an example embodiment of a powered lateral sliding roller board in a third state according to the present disclosure. Some elements of this figure are described above. Thus, same reference characters identify identical and/or like components described above and any repetitive detailed description thereof will hereinafter be omitted or simplified in order to avoid complication.

The board 100 is in a third riding state where the board 100 rides on the right wheel 126 and the roller 140, with the left wheel 126 being raised above the ground surface at the height differential of Δh. The third state can be initiated via the rider R leaning toward the right side 110. The right wheel 126 is assisted in rolling via the roller 140, as powered via the motor. Note that similar state of being exists with respect to the rear truck 128 and the rear roller assembly 138. Also, note that via the rider R shifting weight from one side to another, the rider R can use the powered lateral sliding roller board 100 to carve under power without entering into a sliding mode.

As seen at least from above, FIGS. 3-5 show how the rider R can implement variable speed control while riding under motor power. The rider can also use at least one of the foot hooks 112 to secure the rider's R feet in place to gain additional control of the board 100.

Figure 6:
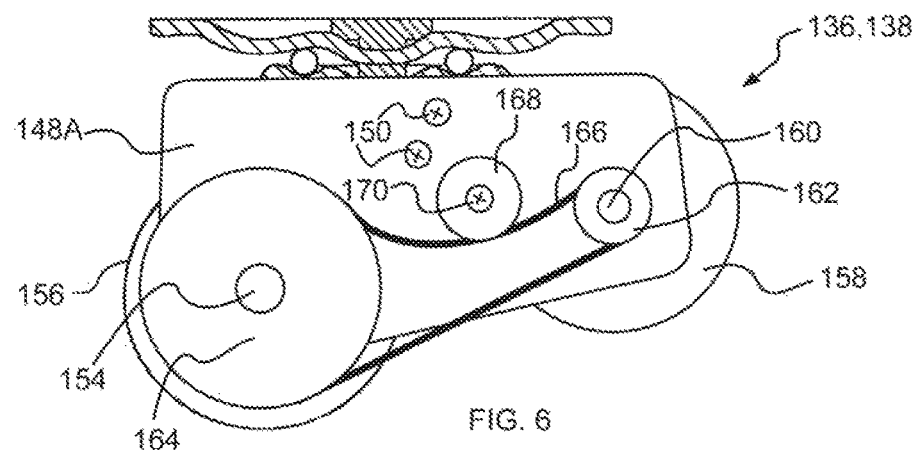
FIG. 6 shows a first side view of an example embodiment of a roller assembly according to the present disclosure.
Figure 7:
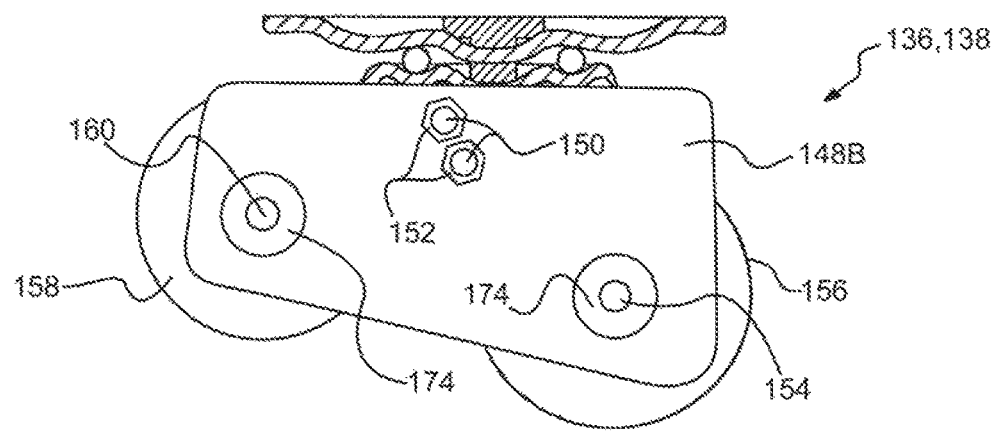
FIG. 7 shows a second side view of an example embodiment of a roller assembly according to the present disclosure.
Figure 8:
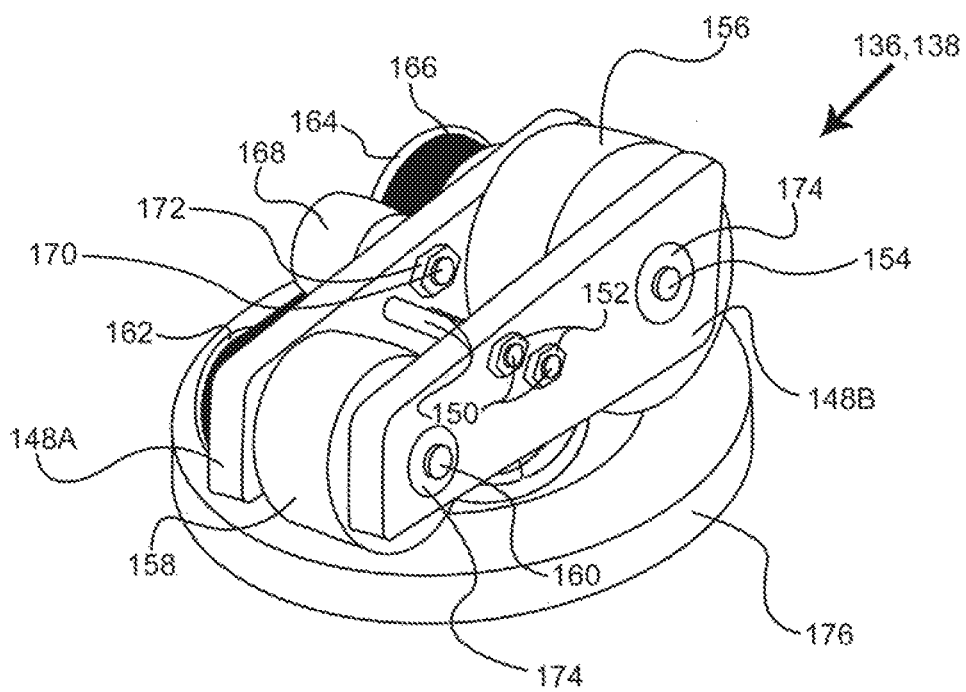
FIG. 8 shows a first perspective view of an example embodiment of a roller assembly according to the present disclosure.
Figure 9:
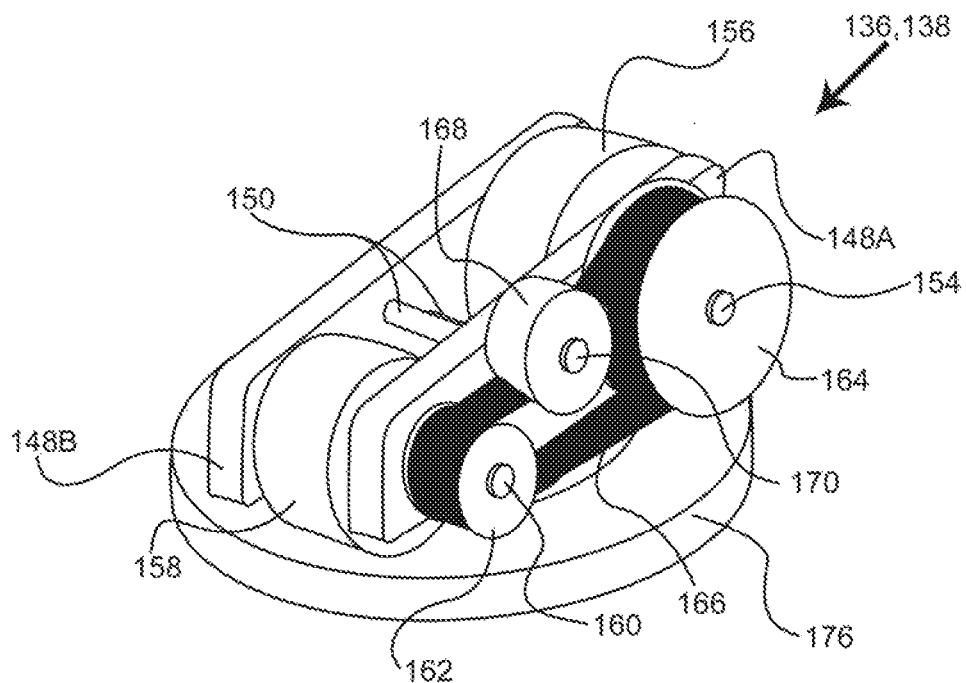
FIG. 9 shows a second perspective view of an example embodiment of a roller assembly according to the present disclosure.
Figure 22:
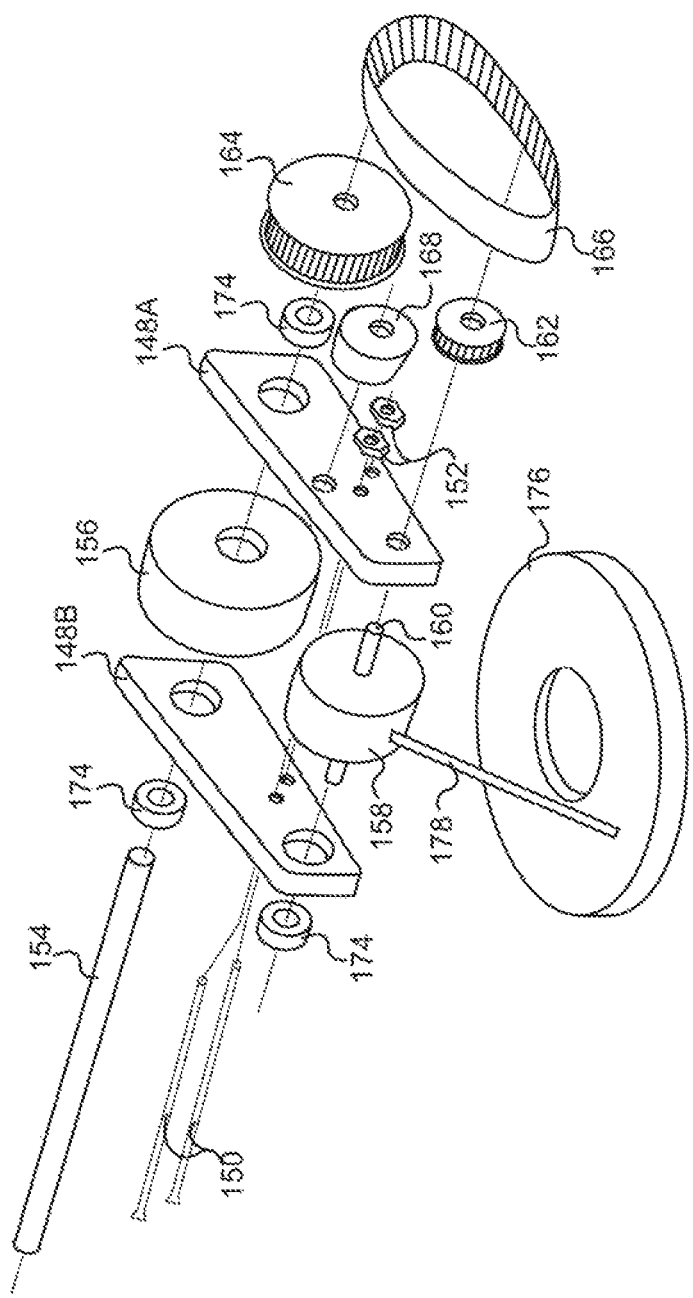
FIG. 22 shows an exploded view of an example embodiment of a powered lateral sliding roller board according to the present disclosure.

FIG. 6 shows a first side view of an example embodiment of a roller assembly according to the present disclosure. FIG. 7 shows a second side view of an example embodiment of a roller assembly according to the present disclosure. FIG. 8 shows a first perspective view of an example embodiment of a roller assembly according to the present disclosure. FIG. 9 shows a second perspective view of an example embodiment of a roller assembly according to the present disclosure. FIG. 22 shows an exploded view of an example embodiment of a powered lateral sliding roller board according to the present disclosure. Some elements of these figures are described above. Thus, same reference characters identify identical and/or like components described above and any repetitive detailed description thereof will hereinafter be omitted or simplified in order to avoid complication.

Each of the roller assemblies 136, 138 comprises a plurality of motor mounts 148, which includes a motor mount 148A and a motor mount 148B. Although the mounts 148 are plate-shaped, the mounts 148 can be shaped differently, such as a lattice or a hemisphere. At least one of the mounts 148 is unitary and/or an assembly. At least one of the mounts 148 comprises at least one of plastic, metal, rubber, wood, and glass, or any combinations thereof. The mounts 148 are coupled to each other via a plurality of fasteners 150, such as a screw or a bolt, and a plurality of nuts 152 fastened onto the fasteners 150. However, note that other coupling techniques can also be used, whether alternatively and/or additionally. For example, the mounts 148 can couple via mating, adhering, or interlocking. At least one of the fasteners 150 comprises at least one of plastic, metal, rubber, wood, and glass, or any combinations thereof. At least one of the nuts 152 comprises at least one of plastic, metal, rubber, wood, and glass, or any combinations thereof.

Each of the roller assemblies 136, 138 comprises an axle 154 extending through the mounts 148, as spanning between the mount 148A and the mount 148B, and a circular roller 156 mounted onto the axle 154, between the mounts 148. The axle 154 comprises at least one of plastic, metal, rubber, wood, and glass, or any combinations thereof. The roller 156 comprises at least one of plastic, metal, rubber, wood, and glass, or any combinations thereof. The roller 156 can comprise a tire. The axle 154 can be fixed with respect to the mounts 148 and/or be freely rotating with respect to the mounts 148. In some embodiments, the axle 154 is telescoping. In some embodiments, at least one of the roller assemblies 136, 138 comprises a locking/brake mechanism to lock the roller 156, such as to prevent the board 100 from sliding downhill.

Each of the roller assemblies 136, 138 comprises a motor 158, such as an engine, an electric motor, an actuator, a hydraulic motor, a rocket motor, a pneumatic motor, and so forth. For example, the motor 158 can comprise a heat engine, an alternating current (AC) electric motor, a direct current (DC) electric motor, and/or a servo electric motor. Note that the when the motor 158 comprises the electric motor, then such motor can be brushed and/or brushless. The motor 158 comprises a drive shaft 160 which extends into the mounts 148. The shaft 160 comprises at least one of plastic, metal, rubber, wood, and glass, or any combinations thereof. In other embodiments, the motor 158 comprises a plurality of shafts 160, which can operate synchronously with each other and/or asynchronously from each other, whether dependently and/or independently from each other. For example, the drive shafts 160 extend in opposing directions from the motor 158. In some embodiments, the motor 158 is configured to provide 5,000 rotations per minute (RPM). In some embodiments, the motor 158 is a 2,000-watt brushless electric motor. In some embodiments, the motor 158 is able to propel the board 100 between about 20 miles per hour (MPH) and about 30 MPH. Note that at least one of the mounts 148 is operably coupled to the roller 156 and therefore the at least one of the mounts 148 rotates with the roller 156. However, in other embodiments, at least one of the mounts 148 comprise the roller 156 or the motor 158. In some embodiments, the board 100 comprises a plurality of sources 122, where the sources 122 power the motors 158 in a one-to-one correspondence, many-to-one correspondence, one-to-many correspondence, and/or many-to-many correspondence. In some embodiments, the motors 158 are of one type, such as the motors 158 are electric, while in other embodiments, the motors 158 are of different types, such as one is brushed and one is brushless.

Each of the roller assemblies 136, 138 comprises a motor pulley wheel 162, a roller pulley wheel 164, and a timing belt 166 mounted under tension over the wheel 162 and the wheel 164 to synchronize rotation therebetween, as driven via the motor 158. The wheel 162 is mounted onto the shaft 160, with the mount 148B interposed therebetween. The wheel 162 comprises at least one of plastic, metal, rubber, wood, and glass, or any combinations thereof. The wheel 164 is mounted onto the axle 154, along with the roller 156 with the mount 148 interposed therebetween. The wheel 164 comprises at least one of plastic, metal, rubber, wood, and glass, or any combinations thereof. The belt 166 comprises at least one of plastic, metal, rubber, wood, a para-aramid synthetic fiber, and glass, or any combinations thereof. The belt 166 comprises an inner surface with a plurality of projections/depressions, such as teeth, sprockets, or grooves.

Each of the wheel 162 and the wheel 164 comprises an outer surface with a plurality of projections/depressions, such as teeth, sprockets, or grooves, for synchronously mating with the projections/depressions of the belt 166. In some embodiments, at least one of the roller assemblies 136, 138 comprises a timing chain, whether alternative and/or in addition to the timing belt 166. The timing chain can comprise at least one of plastic, metal, rubber, wood, and glass, or any combinations thereof. Note that other types of endless timing band are possible as well.

Each of the roller assemblies 136, 138 comprises an tensioner wheel fastener 170 extending through the mount 148B and an tensioner wheel 168 secured to the mount 1486 via the fastener 170 such that the wheel 168 is outside of the belt 166, yet between the wheel 162 and the wheel 164. The fastener 170 can be a bolt or a screw. In some embodiments, at least one of the assemblies 136, 138 comprises a nut 172 fastened onto the fastener 170 such that the mount 1486 is interposed therebetween and the wheel 168 is more secured thereby. The wheel 168 adds tension to the timing belt 166 between the wheel 162 and the wheel 164, thus precluding substantial slippage of the belt 166 while riding under power of the motor 158. Although the wheel 168 is above the belt 166, in other embodiments, the wheel 168 is below the belt 166, such as shown in FIG. 2. The shaft 160 and the axle 154 are secured to the mount 148A via a plurality of bearings 174, such as a plain bearing, a rolling-element bearing, a jewel bearing, a fluid bearing, and so forth. Although the bearings 174 are flush with the mount 148A, in other embodiments, at least one of the bearings 174 is not flush with the mount 148A.

Each of the roller assemblies 136, 138 comprises a rotating slip ring 176 and a stationary brush 178 spanning between the ring 176 and the motor 158 for energy transfer, such as electric current, from the source 122. The brush 178 can comprise graphite, copper or some other conductive material, whether metallic, such as a silver, gold, or aluminum, and/or non-metallic, such as a conductive polymer. The brush 178 rubs onto the ring 176 and as the ring 176 turns, the brush 178 receives and conducts the energy to the motor 158. Note that more than one brush 178 can be used. In other embodiments, the ring 176 is stationary and the brush 178 rotates.

Figure 10:
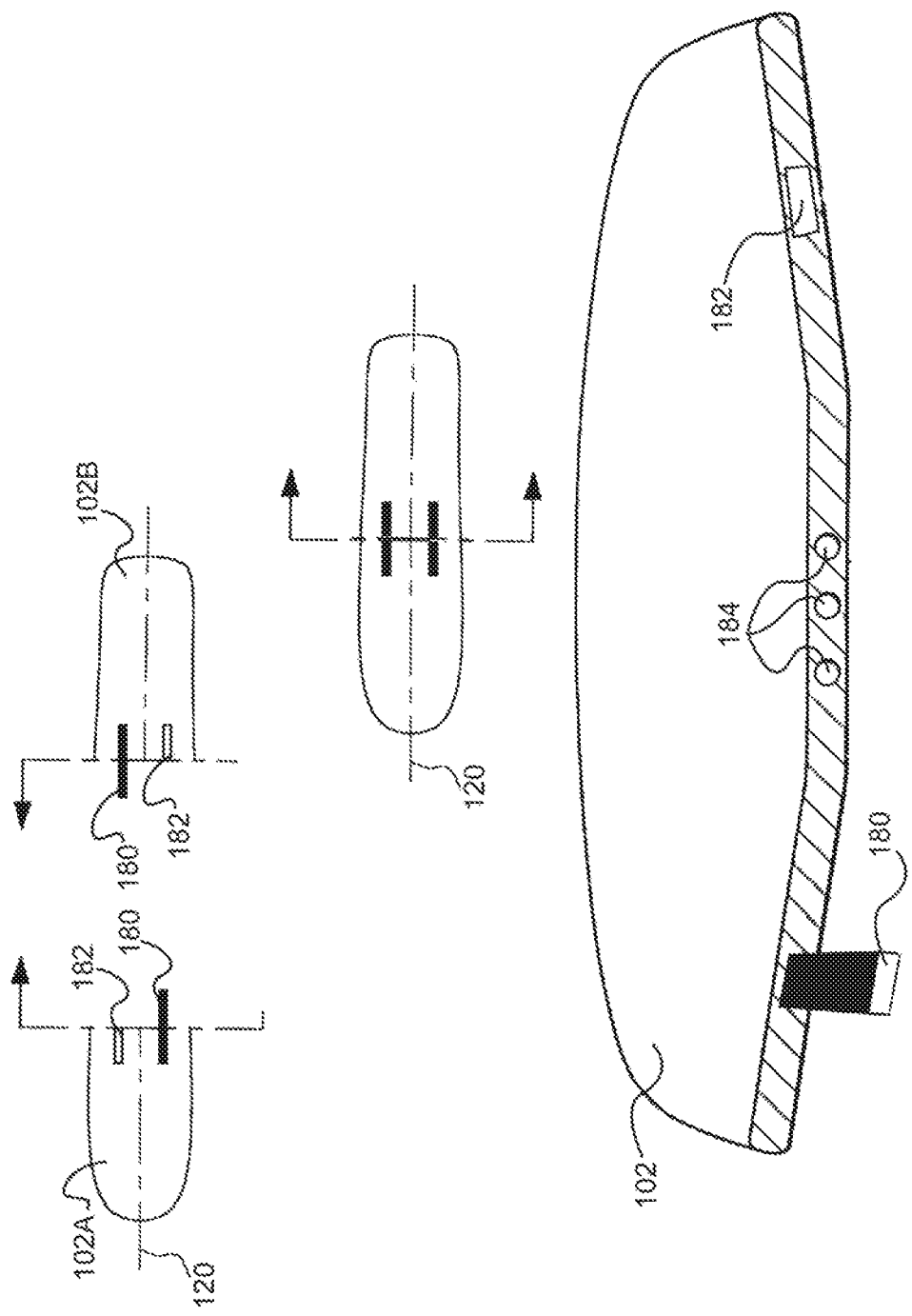
FIG. 10 shows a pair of top views and a front side view of an example embodiment of a powered lateral sliding roller board and a segment of the powered lateral sliding roller board respectively according to the present disclosure.

FIG. 10 shows a pair of top views and a front side view of an example embodiment of a powered lateral sliding roller board and a segment of the powered lateral sliding roller board respectively according to the present disclosure. Some elements of these figures are described above. Thus, same reference characters identify identical and/or like components described above and any repetitive detailed description thereof will hereinafter be omitted or simplified in order to avoid complication.

The platform 102 is defined via a first segment 102A and a second segment 102B when the segments 102A, 102B are assembled with each other, such as manually. Accordingly, the platform 102 is configured for disassembly along a width of the platform 102, which is substantially perpendicular to the line 120. In other embodiments, the platform 102 configured for disassembly along a length of the platform 102, which is substantially parallel to the line 120. In yet other embodiments, the platform 102 is configured for disassembly along a slant of the platform 102, which is substantially diagonal to the line 120. Note that disassembly along at least one of a wavy line, an arcuate line, and a zigzag line is possible as well. The segments 102A, 102B can be symmetrical and/or asymmetrical to each other.

Each of the segments 102A, 102B comprises a male connector 180 and a female connector 182 configured for interlocking and/or mating with the other female connector 182 and the other male connector 180, respectively. The male connector 180 can be unitary to and/or assembled with at least one of the segments 102A, 102B. In other embodiments, the segments 102A, 102B are assembled via a single male connector 180 and a single female connector 182.

Each of the segments 102A, 102B comprises at least one electrical interface connector 184 in contact with at least one wire running along the respective segment 102A, 102B. When the segments 102A, 102B are assembled with each other, such as via the male connector 180 and the female connector 182, the respective connectors 184 electrically interface with each other to create a path, such as a circuit, for conduction of at least one of electrical circuit and data. In other embodiments, at least one pair of the male connector 180 and the female connector 182 comprise a pair of corresponding electrical contacts, such as a pair of leads. For example, an electrical circuit is created along the platform 102, such as via a wire, whether internal to the platform 102 and/or external to the platform 102, when electrical current can flow from one of the segments 102A, 102B to the other across such electrical contacts as such contacts are in electrical contact with each other based on the segment 102A being assembled with the segment 102B to form the platform 102.

Figure 11:
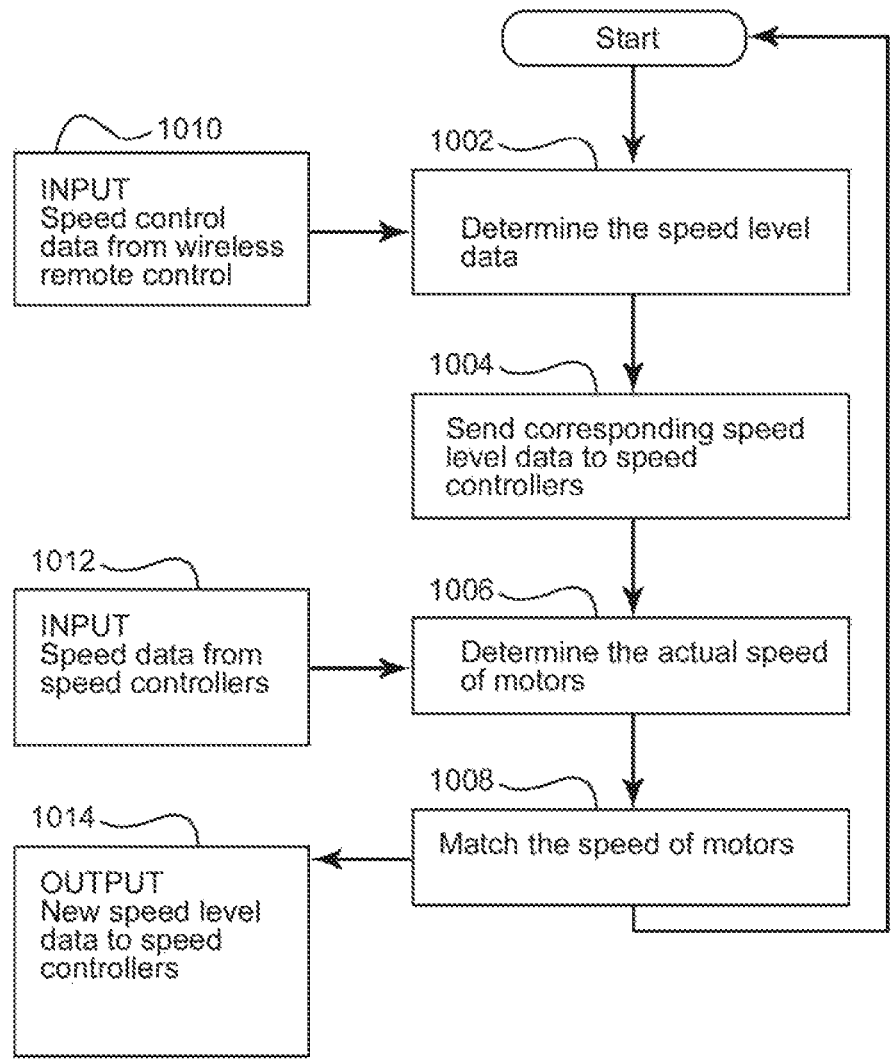
FIG. 11 shows a flowchart of an example embodiment of a computer-implemented process for traction control software employed on a powered lateral sliding roller board according to the present disclosure.

FIG. 11 shows a flowchart of an example embodiment of a computer-implemented process for traction control software employed on a powered lateral sliding roller board according to the present disclosure. Some elements of these figures are described above. Thus, same reference characters identify identical and/or like components described above and any repetitive detailed description thereof will hereinafter be omitted or simplified in order to avoid complication.

The board 100 comprises a hardware processor, such as a single core chip or a multi-core chip, and a memory, such as non-volatile memory, for instance flash memory, operably coupled to the processor. The memory storing a set of instructions for execution by the processor, whether serially and/or in parallel. For example, the processor and the memory can be installed in a controller unit coupled to the platform 102, such as via mating, adhering, fastening, or interlocking. The controller unit comprises a transceiver operably coupled to the processor and an antenna operably coupled to the transceiver for wireless communication with a remote control, such as via a short-range wireless communication protocol, such as infrared based and/or radiofrequency (RF) based. In some embodiments, the controller unit includes a receiver alternative to the transceiver. The set of instructions is instructive to assist in board traction control in order to optimize a riding speed of at least one of the roller assemblies 136, 138 relative to a specific rider input, such as a setting. Some examples of such setting comprise fast speed, slow speed, extreme speed, high performance speed, or some other setting level that controls traction, acceleration, speed, and/or control. The set of instructions is instructive to process a set of inputs, which can comprise a first motor speed, a first motor electrical current, a second motor speed, a second motor electrical current, a user setting, or a remote control potentiometer level. The set of instructions is instructive to provide a set of outputs, which can control at least one of a first motor speed, a first motor acceleration, a first motor current, a second motor speed, a second motor acceleration, and a second motor current, for at least one of the motors 158. In some embodiments, the set of outputs can also control each of the motors 158 independently so that only one motor 158 can be used at a time, if necessary.

In block 1002, the processor determines speed level data, which is based on speed control data obtained from a remote control, as per block 1010. The remote control can be wireless and/or wired. The remote control can be configured to be handheld in the rider's R hand during riding. For example, the remote control can be a wearable computer or a mobile phone.

In block 1004, the processor sends the determined speed level data to a first motor speed controller and a second motor speed controller. One of the roller assemblies 136, 138 comprises the first motor speed controller and the other one of the roller assemblies 136, 138 comprises the second motor speed controller. Accordingly, the first motor controller and the second motor controller respectively sets the first motor 158 and the second motor 158 to a specific speed based on such determined speed level data. Each of the first motor speed controller and the second motor speed controller comprises an electronic circuit which varies at least one of a speed of the motor 158 and a direction of the motor 158. In some embodiments, at least one of the first motor speed controller and the second motor speed controller is configured for dynamic braking. At least one of the first speed controller and the second speed controller can be a stand-alone unit.

In block 1006, the processor determines an actual speed of the first motor 158 and the second motor 158, which is based on speed data obtained from the first motor speed controller and the second motor speed controller, as per block 1012 monitoring. Note that the actual speed of each of the first motor 158 and the second motor 158 is monitored from the speed level data from the first motor speed controller and the second motor speed controller since shifting of the rider's R weight puts different loads on each of the first motor 158 and the second motor 158, which causes one of the motor 158 to potentially spin faster.

In block 1008, the processor calculates the speeds of each of the motors 158 and then slows the faster one of the motors 158 to match the speed of the slower motor 158 based on such calculation, with this new speed data being sent to each corresponding speed controller, or vice versa, via speeding up the slower one of the motors 158. The processor then iteratively loops back to analyze the speed control data input from the remote control, as per block 1014.

Figure 12:
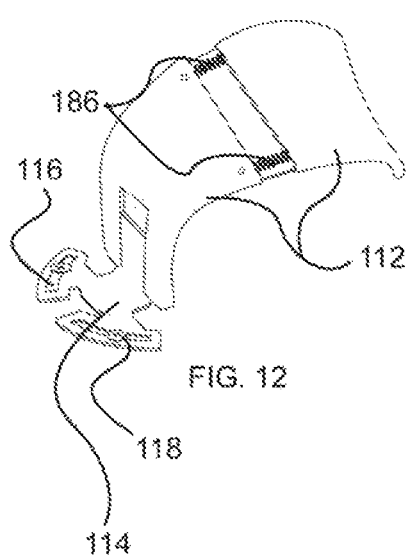
FIG. 12 shows a perspective view of an example embodiment of an elastically adjustable foot hook according to the present disclosure.
Figure 13:
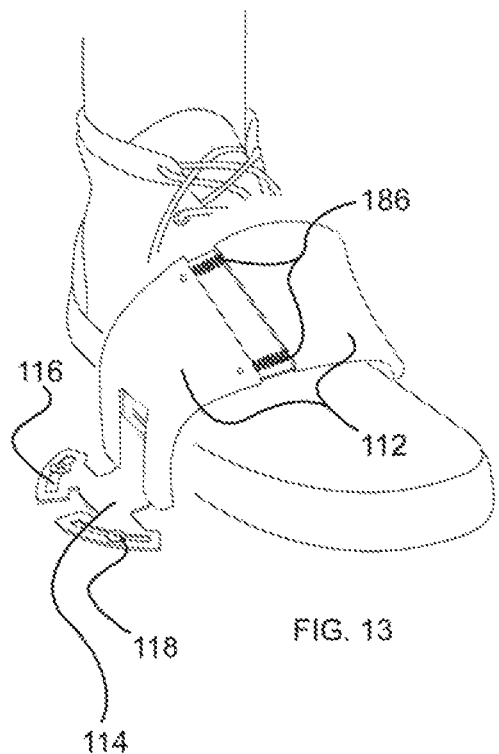
FIG. 13 shows a perspective view of an example embodiment of an elastically-adjustable foot hook engaging a rider's foot according to the present disclosure.

FIG. 12 shows a perspective view of an example embodiment of an elastically adjustable foot hook according to the present disclosure. FIG. 13 shows a perspective view of an example embodiment of an elastically-adjustable foot hook engaging a rider's foot according to the present disclosure. Some elements of these figures are described above. Thus, same reference characters identify identical and/or like components described above and any repetitive detailed description thereof will hereinafter be omitted or simplified in order to avoid complication.

The foot hook 112 is secured to the platform 102 via the plate 114 and the fastener 118 extending through opening 116, which enables lateral rotation of the foot hook 112. The foot hook 112 comprises of a pair of sections adjustably coupled to each other in a biased manner via at least one elastic member, such as a spring 186. When the rider's R foot is underneath the foot hook 112, the spring 186 is in an expanded state such that the spring 186 applies tension to a lateral side of the rider's R foot in order to secure the rider's foot to the board 100. Likewise, when the rider's R foot is not underneath the foot hook 112, the spring 186 is in a contracted state. Note how that the contracted state is shown in FIG. 12 and the expanded state is shown in FIG. 13

Figure 14:
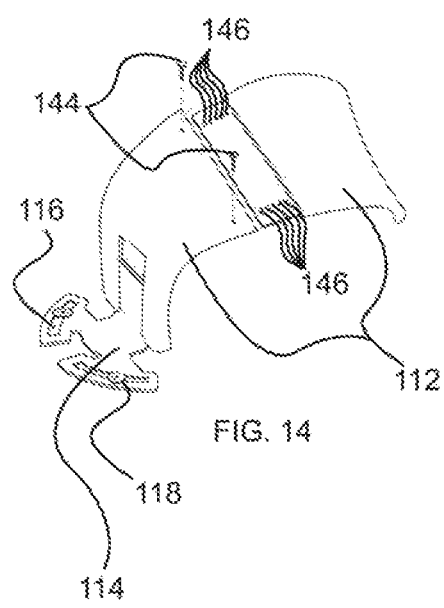
FIG. 14 shows a perspective view of an example embodiment of an fasten-adjustable foot hook according to the present disclosure.

FIG. 14 shows a perspective view of an example embodiment of an fasten-adjustable foot hook according to the present disclosure. Some elements of these figures are described above. Thus, same reference characters identify identical and/or like components described above and any repetitive detailed description thereof will hereinafter be omitted or simplified in order to avoid complication.

The pair of sections of the foot hook 112 are adjustably coupled to each other via the fastener 144 extending through one of the openings 146, as shown in FIG. 1. Each of the openings 146 corresponds to a foot hook position for a foot size. Accordingly, the rider R can manually adjust foot hook section positioning based on the rider's R foot size via selectively fastening or unfastening the fastener 144.

FIG. 15 shows a perspective view of an example embodiment of a pivoting foot hook engaging a rider's foot according to the present disclosure. FIG. 16 shows a perspective view of an example embodiment of a pivoting foot hook in an open position according to the present disclosure. FIG. 17 shows a perspective view of an example embodiment of a pivoting foot hook in a closed position according to the present disclosure. Some elements of these figures are described above. Thus, same reference characters identify identical and/or like components described above and any repetitive detailed description thereof will hereinafter be omitted or simplified in order to avoid complication.

The foot hook 112 comprises a hinge 188, which is biased via an elastic member, such as a spring, disposed underneath the foot hook 112. The hinge 188 can be locking, such as in a ratchet manner. The hinge 188 is correspondingly coupled to the pair of sections of the foot hook 112. Such coupling can be via adhering, fastening, mating, or interlocking. Accordingly, the foot hook 112 is pivotally adjustable via the hinge 188. FIG. 15 shows the foot hook 112 engaging the rider's R foot under biased tension via the elastic member. FIG. 16 shows the foot hook 112 in an open position, as pulled back against tension applied via the elastic member disposed underneath the foot hook 112. FIG. 17 shows the foot hook 112 in a closed position, as let go from the open position. Note that the elastic member brought the foot hook 112 into a default position.

Figure 18:
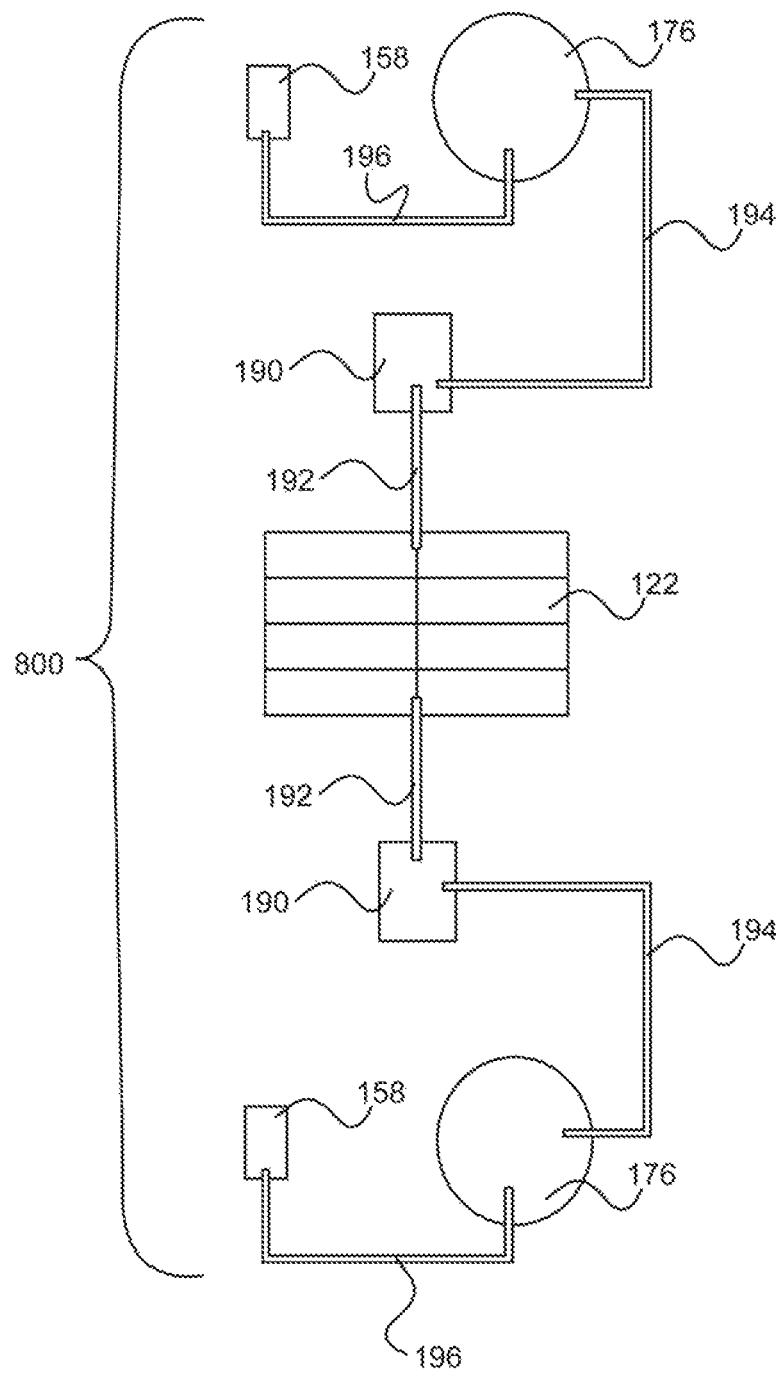
FIG. 18 shows an example embodiment of an electrical schematic diagram of a powered lateral sliding roller board according to the present disclosure.

FIG. 18 shows an example embodiment of an electrical schematic diagram of a powered lateral sliding roller board according to the present disclosure. Some elements of these figures are described above. Thus, same reference characters identify identical and/or like components described above and any repetitive detailed description thereof will hereinafter be omitted or simplified in order to avoid complication.

An electrical schematic diagram 800 of the board 100 shows that the source 122 is connected to a plurality of speed controllers 190, as described above, via a plurality of paths 192, such as a plurality of wires. The speed controllers 190 are connected to the rings 176 via a plurality of paths 194, such as a plurality of wires. The rings 176 are connected to the motors 158 via the brushes 178.

Figure 19:
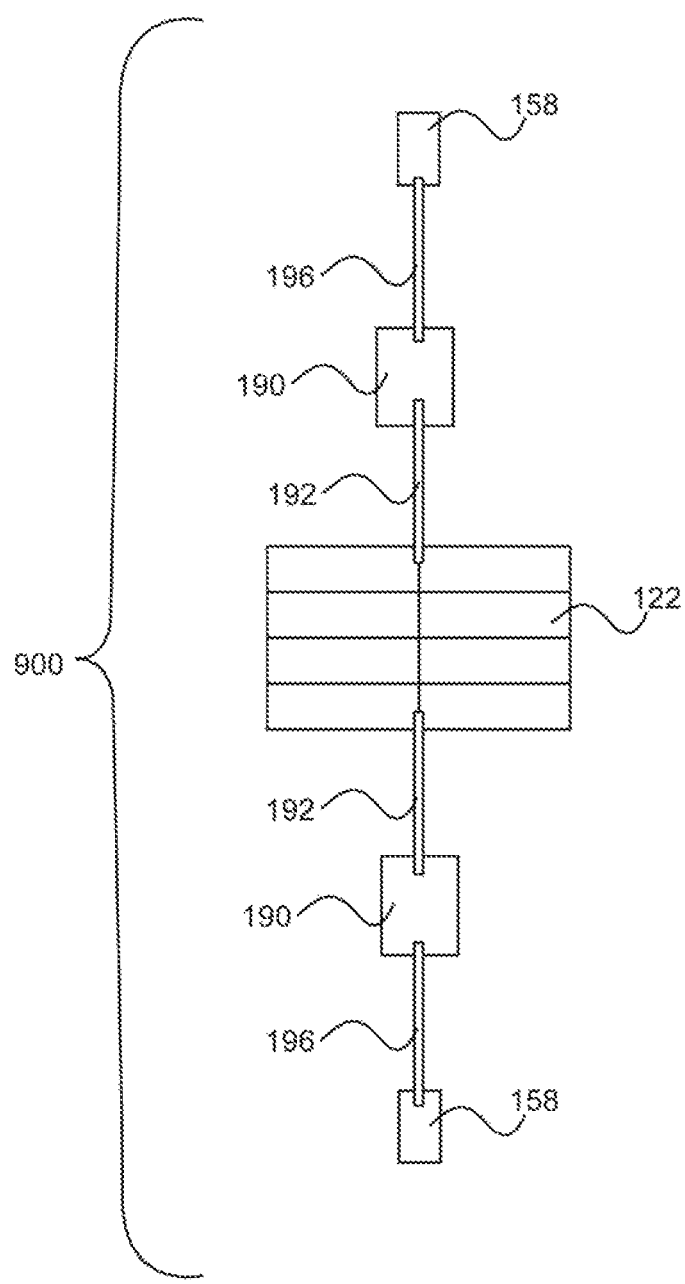
FIG. 19 shows another example embodiment of an electrical schematic diagram of a powered lateral sliding roller board according to the present disclosure.

FIG. 19 shows another example embodiment of an electrical schematic diagram of a powered lateral sliding roller board according to the present disclosure. Some elements of these figures are described above. Thus, same reference characters identify identical and/or like components described above and any repetitive detailed description thereof will hereinafter be omitted or simplified in order to avoid complication.

An electrical schematic diagram 900 lacks the rings 176. The source 122 is connected to the controllers 190 via the paths 192. The controllers 190 are connected to the motors 158 via a plurality of paths 196, such as a plurality of wires.

Figure 20:
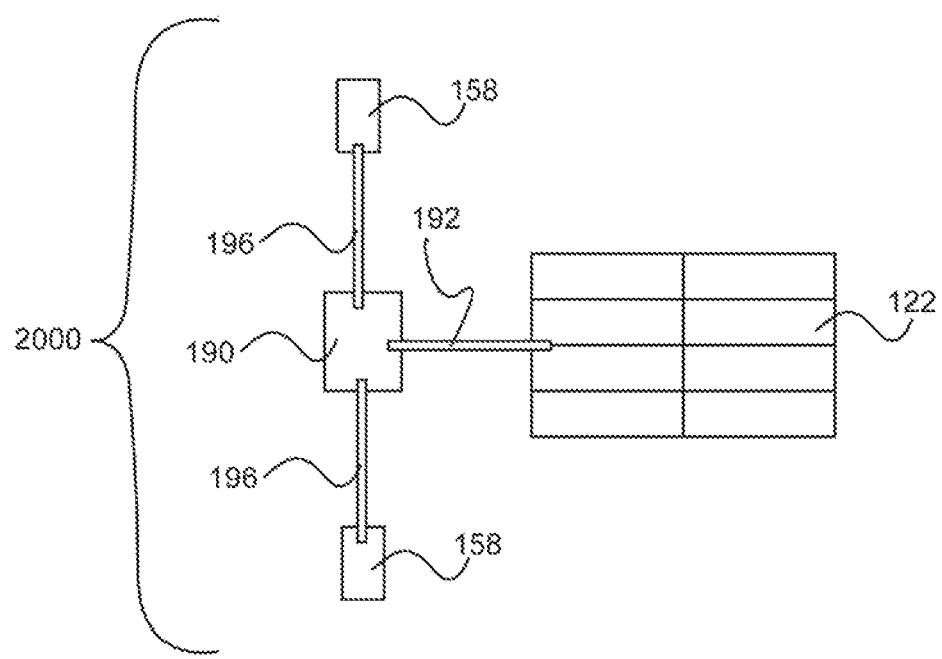
FIG. 20 shows yet another example embodiment of an electrical schematic diagram of a powered lateral sliding roller board according to the present disclosure.

FIG. 20 shows yet another example embodiment of an electrical schematic diagram of a powered lateral sliding roller board according to the present disclosure. Some elements of these figures are described above. Thus, same reference characters identify identical and/or like components described above and any repetitive detailed description thereof will hereinafter be omitted or simplified in order to avoid complication.

An electrical schematic diagram 2000 lacks the rings 176 and also uses only one speed controller 190 for both motors 158. The source 122 is connected to the controller 190 via the path 192. The controller 190 is connected to the motors 158 via the paths 196.

Figure 21:
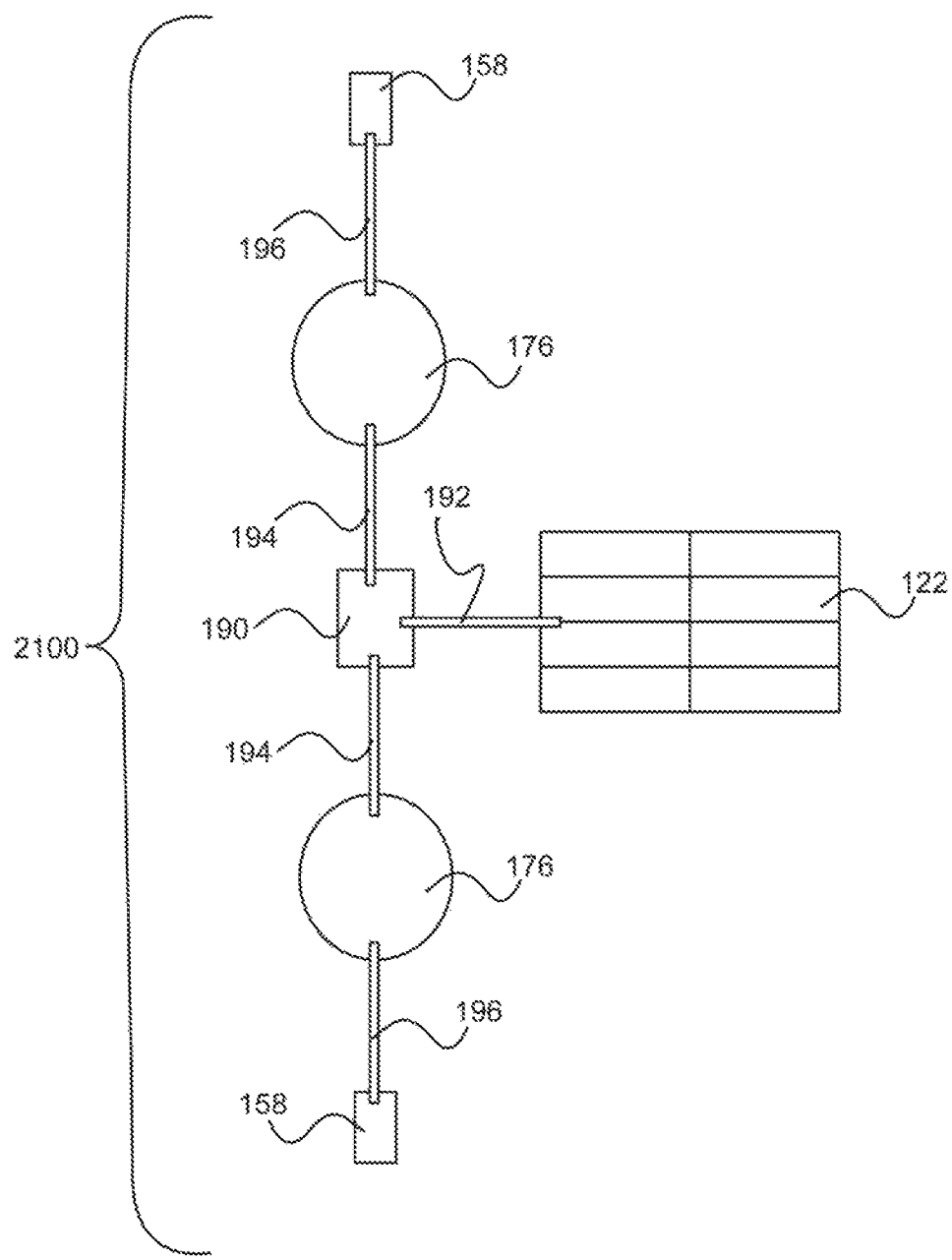
FIG. 21 shows still another example embodiment of an electrical schematic diagram of a powered lateral sliding roller board according to the present disclosure.

FIG. 21 shows still another example embodiment of an electrical schematic diagram of a powered lateral sliding roller board according to the present disclosure. Some elements of these figures are described above. Thus, same reference characters identify identical and/or like components described above and any repetitive detailed description thereof will hereinafter be omitted or simplified in order to avoid complication.

An electrical schematic diagram 2100 includes the rings 176 and also uses only one speed controller 190 for both motors 158. The source 122 is connected to the controller 190 via the path 192. The controller 190 is connected to the rings 176 via the paths 194. The rings 176 are connected to the motors 158 via the brushes 178.

Figure 23:
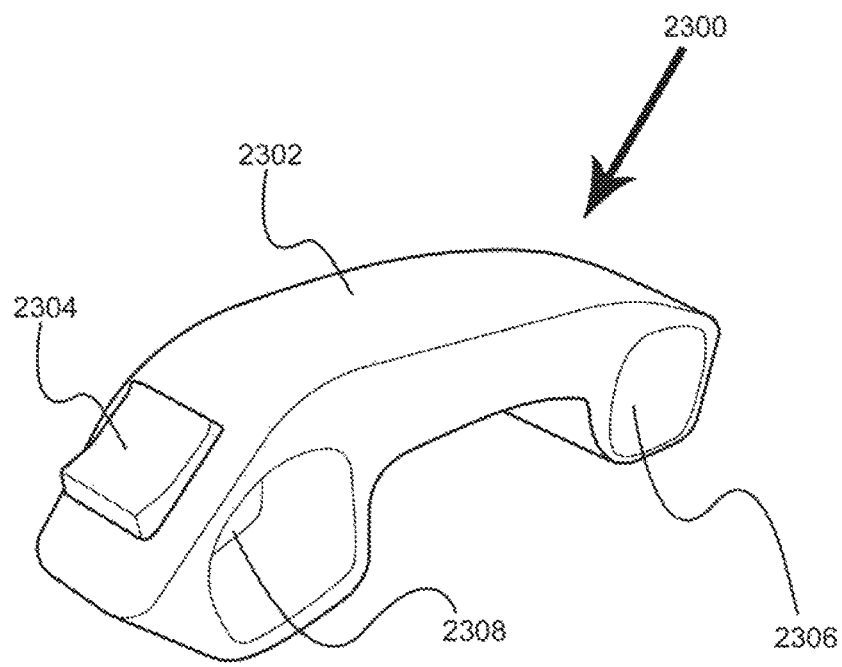
FIG. 23 shows a perspective view of an example embodiment of a remote control for a powered lateral sliding roller board according to the present disclosure.

FIG. 23 shows a perspective view of an example embodiment of a remote control for a powered lateral sliding roller board according to the present disclosure. Some elements of these figures are described above. Thus, same reference characters identify identical and/or like components described above and any repetitive detailed description thereof will hereinafter be omitted or simplified in order to avoid complication.

A remote control 2300 comprises a handle body 2302, which comprises at least one of plastic, metal, rubber, wood, and glass, or any combinations thereof. The body 2302 further comprises a power source, such as a battery, whether a single use battery or a rechargeable battery, a transmitter powered via the power source, and an antenna operably coupled to the transmitter. In other embodiments, the body 2302 comprises at least one of a receiver and a transceiver. The transmitter is configured for wireless communication with the controller unit, as described above, such as for traction control. The body 2302 comprises a sliding potentiometer button 2304, although other types of potentiometers and/or buttons can be used as well. The body 2302 defines a plurality of finger holes 2306, 2308 which are configured to enable the rider R to keep the body 2302 secured in the rider's R hand, while the hand is open and closed. Note that other types of remote control devices are possible as well, such as a wearable computer or a mobile phone. In other embodiments, the remote control unit 2300 is configured for wired communication with the controller unit, as described above, such as for traction control.

Figure 24:
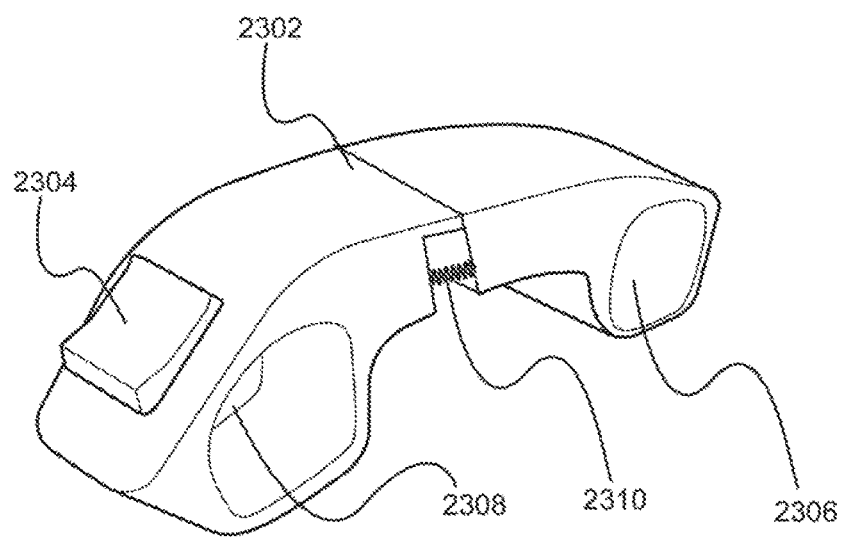
FIG. 24 shows a perspective view of an example embodiment of an adjustable remote control handle according to the present disclosure.

FIG. 24 shows a perspective view of an example embodiment of an adjustable remote control handle according to the present disclosure. Some elements of these figures are described above. Thus, same reference characters identify identical and/or like components described above and any repetitive detailed description thereof will hereinafter be omitted or simplified in order to avoid complication.

The body 2302 comprises a front portion and a rear portion. The front portion of the body 2302 comprises the button 2304 and hole 2308. The rear portion of the body 2302 comprises the hole 2306. The front portion of the body 2302 and the rear portion of the body 2302 are operably coupled to each other via an elastic member 2310, such as a spring or a memory foam. Therefore, the body 2302 is configured to enable manual size adjustment, whether along a hand length, width, and/or height, for riders with different sized hands, such as along a horizontal axis extending along a length of the body 2302. For example, in a first state, where the elastic member is in an expanded position, which is a default position, the front portion of the body 2302 and the rear portion of the body 2302 allow a rider with a first hand size to grip the body 2302. However, in a second state, where the elastic member is in a contracted position, the first portion of the body 2302 is moved toward the rear portion of the body 2302 such that a rider with a second hand size is able to grip the body 2302, where the first hand size is larger than the second hand size.

Figure 25:
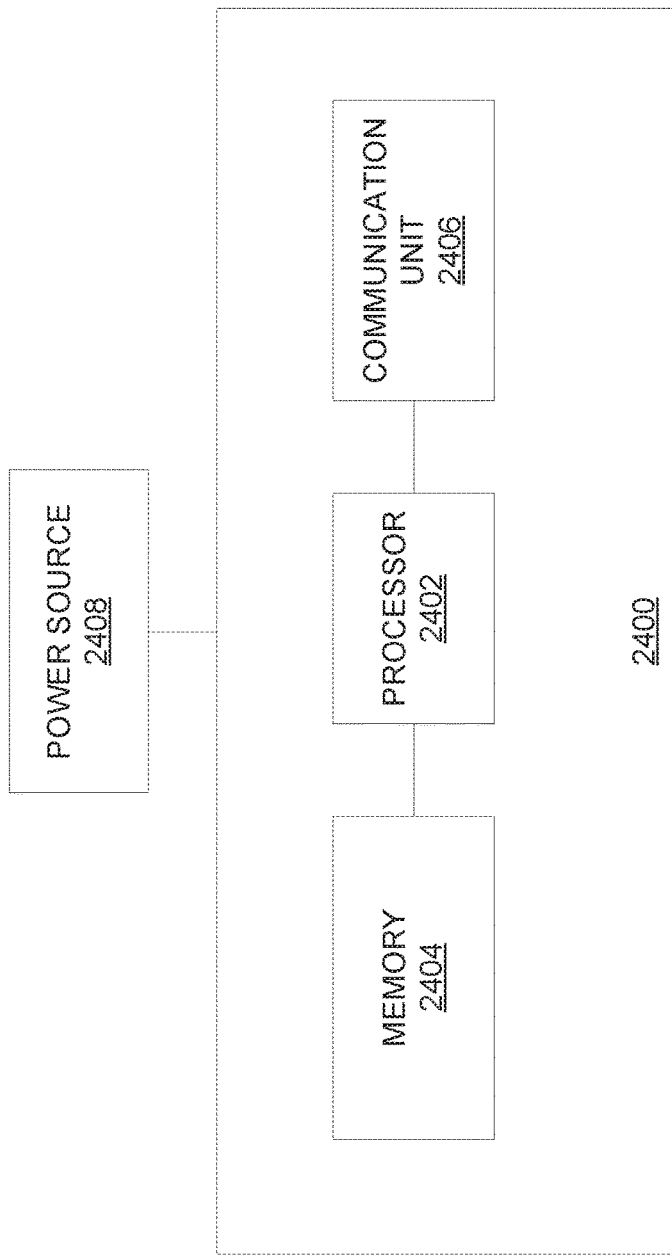
FIG. 25 shows a schematic view of an example embodiment of a processing architecture according to the present disclosure.

FIG. 25 shows a schematic view of an example embodiment of a processing architecture according to the present disclosure. Some elements of these figures are described above. Thus, same reference characters identify identical and/or like components described above and any repetitive detailed description thereof will hereinafter be omitted or simplified in order to avoid complication.

A processing architecture 2400 comprises a hardware processor 2402, such as a central processing unit (CPU), a memory 2404 operably coupled to the processor 2402, such as via a wire, and a communication unit 2406 operably coupled to the processor 2402, such as via a wire. The architecture 2440 can comprise other components, such as an input device of any type and/or an output device of any type. The architecture 2400 can be embodied on the board 100, such as in a controller unit or distinct from the controller unit in any manner, such as on the platform 102, as described above. The architecture 2400 can also be embodied on the remote control 2300. The architecture 2400 is powered via a power source 2408, such as a battery, as described above. Alternatively, the architecture 2400 comprises the source 2408.

The processor 2402 can be a single core chip or a multi-core chip. The memory 2404 can be non-volatile memory, such as flash memory. The memory 2404 stores a set of instructions for execution by the processor 2402, whether serially and/or in parallel. For example, the processor 2402 and the memory 2404 can be installed in a controller coupled to the platform 102, such as via mating, adhering, fastening, or interlocking, as described above. The unit 2406 comprises a transceiver and an antenna operably coupled to the transceiver, such as via a wire, for wireless communication, such as via a short-range wireless communication protocol, such as infrared based and/or radiofrequency (RF) based. In some embodiments, the unit 2406 includes a receiver alternative to the transceiver. The set of instructions can be instructive of various manners, such as to assist in board traction control in order to optimize a riding speed of at least one of the roller assemblies 136, 138 relative to a specific rider input, such as a setting.

FIG. 26 shows a perspective view of an example embodiment of a motorized wheel assembly according to the present disclosure. Some elements of these figures are described above. Thus, same reference characters identify identical and/or like components described above and any repetitive detailed description thereof will hereinafter be omitted or simplified in order to avoid complication.

In some embodiments, one or more electric motors can reside inside or outside of the various wheels in a variety of configurations. For example, an electric motor 160 can be located or positioned inside the roller 156. The board 100 comprises a motorized wheel assembly 400, which includes an electric motor 160 positioned or situated inside the roller 156, whether in whole or in part. The assembly 400 is connected or otherwise coupled to the mounts 148 via the axle 154. The axle 154 holds an electric motor stator 160b secure in place such that an electric motor rotor 160a and the roller 156 are free to rotate about an axis along the axle 154. The motorized wheel assembly 400 allows or provides for an omission of at least one component, such as the wheel 162, the wheel 164, the wheel 168, or the belt 166.

FIGS. 27A-27C show a plurality of side views of how an electric motor rotates with a roller according to the present disclosure. Some elements of these figures are described above. Thus, same reference characters identify identical and/or like components described above and any repetitive detailed description thereof will hereinafter be omitted or simplified in order to avoid complication.

The electric motor 160 is rotationally operative with the roller 156. In FIG. 27A, the electric motor rotor 160a is connected or otherwise coupled to the roller 156. The electric motor rotor 160a and the roller 156 are configured to rotate around the electric motor stator 160b. In FIG. 27B, the electric motor rotor 160a and the roller 156 rotate together around the electric motor stator 160b. In FIG. 27C, even further rotation of the electric motor rotor 160a and the roller 156 is shown, where both are rotating around the electric motor stator 160b.

FIG. 28 shows a top view of an electric motor and a roller according to the present disclosure. Some elements of these figures are described above. Thus, same reference characters identify identical and/or like components described above and any repetitive detailed description thereof will hereinafter be omitted or simplified in order to avoid complication. The electric motor 160 is positioned inside the pulley 156.

Figure 29:
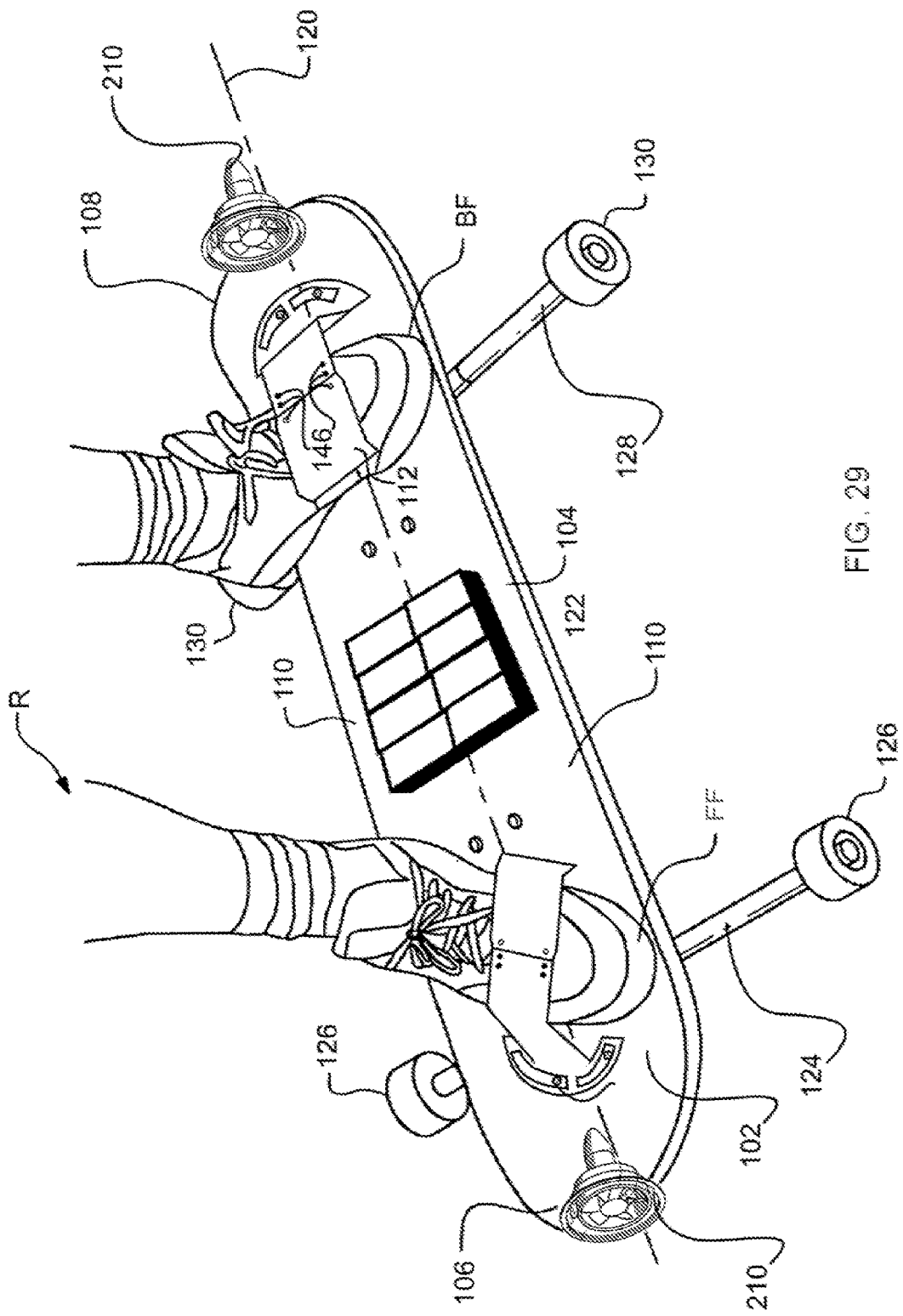
FIG. 29 shows a perspective view of an example embodiment of a powered lateral sliding roller board with a fan according to the present disclosure.

FIG. 29 shows a perspective view of an example embodiment of a powered lateral sliding roller board with a fan according to the present disclosure. Some elements of these figures are described above. Thus, same reference characters identify identical and/or like components described above and any repetitive detailed description thereof will hereinafter be omitted or simplified in order to avoid complication.

The board 100 can drivably travel via a ducted fan in addition to, or without, a powered caster wheel, as disclosed herein. For example, the board 100 includes a plurality of ducted fans 210, one placed on a first end portion, such as a front portion or a leading edge portion, and a second end portion, such as a back portion or a trailing edge portion, of the platform 102. Note that the fans 210 can be equivalent to or different from each other, in structure or function or shape or size or power output or aerodynamics. Note that the fans 210 can be directionally fixed or rotatable, whether manually or automatically, such as based on direction of travel as automatically determined via an-onboard sensor coupled to the board 100, such as a compass or a board orientation sensor. The fans 210 can be placed in a variety of numbers and configurations on a top side, lateral sides, a front portion, a back portion, a bottom portion or underside of the platform 102 or even attached to the rider or any other part of the board 100. One example of the ducted fan 210 can be found in U.S. Pat. No. 4,250,658, which is fully incorporated by reference herein for all purposes. However, note that there are many examples of devices, such as electronic motors, engines, ducted fans, and other propulsion devices, which can be used in or on the board 100.

Accordingly, the board 100 brings a new freedom of movement to skateboarding, approximating many of movements found in snowboarding, while traveling under power across terrain. The board 100 provides an ability to "carve," as a conventional skateboard can, where leaning the rider's R weight to one side causes the board 100 to turn in that direction, while permitting a mode of omnidirectional motion, where the board 100 can easily travel forwards, backwards, sideways, and/or any combination thereof, and an ability to transition smoothly and controllably between the carving mode and the omnidirectional mode. The board 100 is configured to allow all of such snowboard movements across terrain where such movements were traditionally impossible, such as flat terrain and up inclined terrain.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

In some embodiments, an apparatus or system comprise at least one processor, and memory storing instructions that, when executed by the at least one processor, cause the apparatus or system to perform one or more methodological acts as described herein. In some embodiments, the memory stores data, such as one or more structures, metadata, lines, tags, blocks, strings, or other suitable data organizations.

As will be appreciated by one skilled in the art, aspects of this disclosure can be embodied as a system, method or computer program product. Accordingly, aspects of the present disclosure can take the form of an entirely hardware embodiment, an entirely software embodiment (including firmware, resident software, micro-code, etc.) or as embodiments combining software and hardware aspects that can all generally be referred to herein as a "circuit," "module" or "system." Furthermore, aspects of the disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable medium can be transmitted using any appropriate medium, including but not limited to wireless, wireline, optical fiber cable, radiofrequency (RF), etc., or any suitable combination of the foregoing.

Computer program code for carrying out operations for aspects of the present disclosure can be written in any combination of one or more programming language, including an object oriented programming language, such as Java, Smalltalk, C++ or the like and conventional procedural programming language, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the steps can be performed in a differing order or steps can be added, deleted or modified. All of these variations are considered a part of the disclosure. It will be understood that those skilled in the art, both now and in the future, can make various improvements and enhancements which fall within the scope of the claims which follow.

The description of the present disclosure has been presented for purposes of illustration and description, but is not intended to be fully exhaustive and/or limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of the present disclosure.

The invention claimed is:

1. An apparatus comprising:
a platform;
a plurality of trucks coupled to the platform, wherein each of the trucks includes a wheel;
a roller assembly coupled to the platform, wherein the roller assembly is configured for an omnidirectional rotation about a first axis, wherein the roller assembly is driven by a motor, wherein the roller assembly includes a roller rotating about a second axis, wherein the first axis is distinct from the second axis, wherein the roller assembly comprises the motor, wherein the roller assembly comprises a roller, wherein the roller extends along the motor circumferentially; and a slip ring which conducts power to the motor.

2. The apparatus of claim 1, wherein the roller assembly comprises an axle, a stator, and a rotor, wherein the motor comprises the stator and the rotor, wherein the axle is coupled to the stator such that the rotor rotates about the axle.

3. The apparatus of claim 1, further comprising:
a battery configured to power the motor; and
a photovoltaic cell configured to charge the battery.

4. The apparatus of claim 1, wherein the roller assembly comprises a plurality of mounts, wherein the roller is positioned between at least two of the mounts.

5. The apparatus of claim 4, wherein the motor is positioned between the at least two of the mounts.

6. The apparatus of claim 1, wherein the platform is defined via a first platform segment and a second platform segment, wherein the first segment comprises a first circuit portion, wherein the second segment comprises a second circuit portion, wherein the first circuit portion and the second circuit portion form a circuit based on the first segment and the second segment mating with each other, wherein the circuit facilitates powering of the motor.

* * * * *